United States Patent
Dureau et al.

(10) Patent No.: US 12,225,263 B2
(45) Date of Patent: *Feb. 11, 2025

(54) SYSTEMS AND METHODS FOR OPERATING A SET TOP BOX

(71) Applicant: Google LLC, Mountain View, CA (US)

(72) Inventors: Vincent Dureau, Palo Alto, CA (US); Nathan Leslie Sandland, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,608

(22) Filed: Aug. 14, 2023

(65) Prior Publication Data
US 2023/0388582 A1 Nov. 30, 2023

Related U.S. Application Data

(63) Continuation of application No. 17/313,374, filed on May 6, 2021, now Pat. No. 11,729,459, which is a
(Continued)

(51) Int. Cl.
*H04N 21/44* (2011.01)
*H04N 5/50* (2006.01)
(Continued)

(52) U.S. Cl.
CPC ......... *H04N 21/44008* (2013.01); *H04N 5/50* (2013.01); *H04N 21/41407* (2013.01);
(Continued)

(58) Field of Classification Search
None
See application file for complete search history.

(56) References Cited

U.S. PATENT DOCUMENTS

| 5,355,162 A | 10/1994 | Yazolino et al. |
| 6,104,334 A | 8/2000 | Allport et al. |
| (Continued) | | |

FOREIGN PATENT DOCUMENTS

| CN | 101309353 | 11/2008 |
| CN | 101388142 | 3/2009 |
| (Continued) | | |

OTHER PUBLICATIONS

Examination Report dated Mar. 3, 2020 in IN Patent Application No. 201647032681.
(Continued)

*Primary Examiner* — Junior O Mendoza
(74) *Attorney, Agent, or Firm* — Brake Hughes Bellermann LLP

(57) ABSTRACT

Features of various implementations are used to control operation of a second electronic device from a first electronic device using indirect control methods and optical character recognition. In some implementations, communication between a primary set-top box and a supplemental set-top box is configured in order to avoid the need for one or more provider-specific APIs. For example, one aspect of the disclosure is a method of identifying commands that can be used to control one or more features of a primary set-top box (e.g., DVR or VOD features) by a supplemental set-top box issuing commands to the primary set-top box via a wireless (e.g., IR) transmitter, and then using optical character recognition to identify the outcomes of those commands as displayed on a primary TV display or secondary display.

19 Claims, 14 Drawing Sheets

Related U.S. Application Data continuation of application No. 16/257,013, filed on Jan. 24, 2019, now Pat. No. 11,006,175, which is a continuation of application No. 15/835,350, filed on Dec. 7, 2017, now Pat. No. 10,194,201, which is a continuation of application No. 14/194,551, filed on Feb. 28, 2014, now Pat. No. 9,866,899, which is a continuation-in-part of application No. 14/089,709, filed on Nov. 25, 2013, now Pat. No. 9,832,413, which is a continuation-in-part of application No. 13/623,043, filed on Sep. 19, 2012, now Pat. No. 10,735,792.

(51) Int. Cl.
| | |
|---|---|
| *H04N 21/414* | (2011.01) |
| *H04N 21/4227* | (2011.01) |
| *H04N 21/432* | (2011.01) |
| *H04N 21/433* | (2011.01) |
| *H04N 21/45* | (2011.01) |
| *H04N 21/472* | (2011.01) |
| *H04N 21/482* | (2011.01) |
| *H04N 21/658* | (2011.01) |

(52) U.S. Cl.
CPC ..... *H04N 21/4227* (2013.01); *H04N 21/4325* (2013.01); *H04N 21/4334* (2013.01); *H04N 21/4532* (2013.01); *H04N 21/47202* (2013.01); *H04N 21/47214* (2013.01); *H04N 21/482* (2013.01); *H04N 21/6582* (2013.01)

(56) References Cited

U.S. PATENT DOCUMENTS

| | | | |
|---|---|---|---|
| 6,597,374 | B1 | 7/2003 | Baker et al. |
| 6,658,662 | B1 | 12/2003 | Nielsen |
| 6,690,392 | B1 | 2/2004 | Wugoski |
| 6,742,183 | B1 | 5/2004 | Reynolds et al. |
| 7,031,553 | B2 | 4/2006 | Myers et al. |
| 7,113,230 | B1 | 9/2006 | Genovese et al. |
| 7,134,131 | B1 | 11/2006 | Hendricks et al. |
| 7,620,268 | B2 | 11/2009 | Myers et al. |
| 7,664,317 | B1 | 2/2010 | Sowerby |
| 7,787,705 | B2 | 8/2010 | Sun et al. |
| 7,814,524 | B2 | 10/2010 | Candelore |
| 7,991,801 | B2 | 8/2011 | Chen et al. |
| 8,006,268 | B2 | 8/2011 | Sloo |
| 8,077,263 | B2 | 12/2011 | Candelore |
| 9,113,202 | B1 | 8/2015 | Wiseman et al. |
| 9,578,072 | B2 | 2/2017 | Walker |
| 9,788,055 | B2 | 10/2017 | Verrilli et al. |
| 9,832,413 | B2 | 11/2017 | Sandland et al. |
| 9,866,899 | B2* | 1/2018 | Dureau .............. H04N 21/4334 |
| 9,948,972 | B2 | 4/2018 | Moon et al. |
| 10,194,201 | B2* | 1/2019 | Dureau ............ H04N 21/41407 |
| 10,237,612 | B2 | 3/2019 | Verrilli et al. |
| 10,701,440 | B2 | 6/2020 | Verrilli et al. |
| 11,006,175 | B2* | 5/2021 | Dureau .............. H04N 21/4532 |
| 11,140,443 | B2 | 10/2021 | Verrilli et al. |
| 11,729,459 | B2* | 8/2023 | Dureau .............. H04N 21/4532 725/19 |
| 2002/0042920 | A1 | 4/2002 | Thomas et al. |
| 2003/0004914 | A1 | 1/2003 | McGreevy |
| 2004/0075692 | A1 | 4/2004 | Matichuk |
| 2004/0183947 | A1 | 9/2004 | Lee |
| 2004/0199502 | A1 | 10/2004 | Wong et al. |
| 2004/0201720 | A1 | 10/2004 | Robins et al. |
| 2004/0239809 | A1 | 12/2004 | Kim et al. |
| 2004/0260621 | A1 | 12/2004 | Foster et al. |
| 2005/0020238 | A1 | 1/2005 | Eastman et al. |
| 2005/0123200 | A1 | 6/2005 | Myers et al. |
| 2005/0177847 | A1 | 8/2005 | Konig et al. |
| 2005/0201619 | A1 | 9/2005 | Sun et al. |
| 2005/0251823 | A1 | 11/2005 | Saarikivi |
| 2006/0026128 | A1 | 2/2006 | Bier |
| 2006/0265731 | A1 | 11/2006 | Matsuda |
| 2007/0073704 | A1 | 3/2007 | Bowden et al. |
| 2007/0186228 | A1 | 8/2007 | Ramaswamy et al. |
| 2007/0192910 | A1 | 8/2007 | Vu et al. |
| 2008/0028424 | A1 | 1/2008 | Cho |
| 2008/0095433 | A1 | 4/2008 | Johnson et al. |
| 2008/0097984 | A1 | 4/2008 | Candelore |
| 2008/0098426 | A1 | 4/2008 | Candelore |
| 2008/0098432 | A1 | 4/2008 | Hardacker et al. |
| 2008/0098433 | A1 | 4/2008 | Hardacker et al. |
| 2008/0127253 | A1 | 5/2008 | Zhang et al. |
| 2008/0143880 | A1 | 6/2008 | Jung et al. |
| 2008/0146277 | A1 | 6/2008 | Anglin et al. |
| 2008/0196075 | A1* | 8/2008 | Candelore .............. H04N 21/47 725/113 |
| 2008/0226119 | A1 | 9/2008 | Candelore et al. |
| 2008/0244637 | A1 | 10/2008 | Candelore |
| 2008/0273114 | A1 | 11/2008 | Hardacker et al. |
| 2008/0279453 | A1* | 11/2008 | Candelore .......... G06V 30/1456 353/42 |
| 2009/0009532 | A1 | 1/2009 | Hallberg |
| 2009/0077049 | A1 | 3/2009 | Seet et al. |
| 2009/0077065 | A1 | 3/2009 | Song et al. |
| 2009/0083801 | A1 | 3/2009 | Hardacker et al. |
| 2009/0205000 | A1 | 8/2009 | Christensen et al. |
| 2009/0320070 | A1 | 12/2009 | Inoguchi |
| 2009/0328237 | A1 | 12/2009 | Rodriguez et al. |
| 2010/0008266 | A1 | 1/2010 | Reda et al. |
| 2010/0037264 | A1 | 2/2010 | Hardacker et al. |
| 2010/0123735 | A1 | 5/2010 | Blanchard et al. |
| 2010/0153831 | A1 | 6/2010 | Beaton |
| 2010/0165207 | A1 | 7/2010 | Deng et al. |
| 2010/0192178 | A1 | 7/2010 | Candelore |
| 2010/0225830 | A1 | 9/2010 | Blanchard et al. |
| 2010/0253533 | A1 | 10/2010 | Lee et al. |
| 2010/0293162 | A1 | 11/2010 | Odland et al. |
| 2010/0293195 | A1 | 11/2010 | Houghton |
| 2010/0296007 | A1 | 11/2010 | Cooper |
| 2011/0025842 | A1 | 2/2011 | King et al. |
| 2011/0030016 | A1 | 2/2011 | Pino et al. |
| 2011/0081948 | A1 | 4/2011 | Shirai et al. |
| 2011/0202848 | A1 | 8/2011 | Ismalon |
| 2011/0247042 | A1* | 10/2011 | Mallinson .......... H04N 21/2225 725/86 |
| 2011/0247044 | A1 | 10/2011 | Jacoby |
| 2011/0282906 | A1 | 11/2011 | Wong et al. |
| 2011/0289532 | A1 | 11/2011 | Yu et al. |
| 2011/0296463 | A1 | 12/2011 | Suslov |
| 2011/0311095 | A1 | 12/2011 | Archer |
| 2012/0079534 | A1 | 3/2012 | Huang |
| 2012/0143595 | A1 | 6/2012 | Li et al. |
| 2012/0210233 | A1 | 8/2012 | Davis et al. |
| 2013/0041921 | A1 | 2/2013 | Cooper et al. |
| 2013/0101002 | A1 | 4/2013 | Gettings et al. |
| 2013/0114849 | A1 | 5/2013 | Pengelly et al. |
| 2013/0120590 | A1 | 5/2013 | Clark |
| 2013/0276029 | A1 | 10/2013 | Li et al. |

FOREIGN PATENT DOCUMENTS

| | | |
|---|---|---|
| CN | 102369724 | 3/2012 |
| CN | 104219548 | 12/2014 |
| EP | 0246410 | 8/1988 |
| EP | 2464103 | 6/2012 |
| KR | 20110040882 | 4/2011 |

OTHER PUBLICATIONS

Examination Report dated Mar. 24, 2020 in EP Patent Application No. 15710665.9.

Extended European Search Report dated Oct. 21, 2022 in EP Patent Application No. 22172584.9.

International Search Report and Written Opinion dated Mar. 19, 2014 in International Patent Application No. PCT/US2013/060697.

International Search Report and Written Opinion dated Jul. 6, 2015 in International Patent Application No. PCT/US2015/017999.

(56) References Cited

OTHER PUBLICATIONS

Notice of Allowance dated Jan. 6, 2021 in U.S. Appl. No. 16/257,013.
Notice of Allowance dated Mar. 11, 2020 in U.S. Appl. No. 13/623,043.
Notice of Allowance dated Mar. 30, 2023 in U.S. Appl. No. 17/313,374.
Notice of Allowance dated Mar. 31, 2020 in U.S. Appl. No. 16/276,379.
Notice of Allowance dated May 12, 2021 in U.S. Appl. No. 16/912,592.
Notice of Allowance dated Jun. 1, 2017 in U.S. Appl. No. 13/831,166.
Notice of Allowance dated Aug. 23, 2017 in U.S. Appl. No. 14/089,709.
Notice of Allowance dated Sep. 12, 2018 in U.S. Appl. No. 15/835,350.
Notice of Allowance dated Oct. 5, 2017 in U.S. Appl. No. 14/194,551.
Notice of Allowance dated Oct. 29, 2018 in U.S. Appl. No. 15/727,394.
Notice of Allowance dated Nov. 2, 2020 in KR Patent Application No. 10-2020-7006321.
Office Action dated Jan. 10, 2020 in U.S. Appl. No. 16/257,013.
Office Action dated Jan. 10, 2020 in U.S. Appl. No. 16/276,379.
Office Action dated Jan. 14, 2014 in U.S. Appl. No. 13/623,043.
Office Action dated Jan. 15, 2016 in U.S. Appl. No. 14/089,709.
Office Action dated Jan. 20, 2023 in U.S. Appl. No. 17/313,374.
Office Action dated Feb. 3, 2021 in U.S. Appl. No. 16/912,592.
Office Action dated Feb. 28, 2014 in U.S. Appl. No. 13/381,166.
Office Action dated Feb. 28, 2017 in U.S. Appl. No. 13/623,043.
Office Action dated Mar. 2, 2015 in U.S. Appl. No. 14/089,709.
Office Action dated Mar. 14, 2023 in U.S. Appl. No. 17/492,881.
Office Action dated Mar. 25, 2016 in U.S. Appl. No. 13/381,166.
Office Action dated Apr. 3, 2020 in CN Patent Application No. 201811633924.X.
Office Action dated Apr. 10, 2015 in U.S. Appl. No. 14/194,551.
Office Action dated Apr. 11, 2017 in U.S. Appl. No. 14/089,709.
Office Action dated Apr. 25, 2018 in U.S. Appl. No. 15/835,350.
Office Action dated May 5, 2017 in U.S. Appl. No. 14/194,551.
Office Action dated May 25, 2020 in KR Patent Application No. 10-2020-7006321.
Office Action dated Jun. 2, 2015 in U.S. Appl. No. 13/623,043.
Office Action dated Jun. 10, 2013 in U.S. Appl. No. 13/623,043.
Office Action dated Jun. 16, 2021 in CN Patent Application No. 201910521231.X.
Office Action dated Jun. 18, 2015 in U.S. Appl. No. 14/089,709.
Office Action dated Jun. 29, 2017 in CN Patent Application No. 201380058308.5.
Office Action dated Jul. 28, 2016 in U.S. Appl. No. 14/089,709.
Office Action dated Aug. 7, 2019 in KR Patent Application No. 10-2019-7019490.
Office Action dated Aug. 12, 2016 in U.S. Appl. No. 13/623,043.
Office Action dated Aug. 16, 2018 in U.S. Appl. No. 15/727,394.
Office Action dated Aug. 16, 2022 in U.S. Appl. No. 17/492,881.
Office Action dated Sep. 12, 2014 in U.S. Appl. No. 13/381,166.
Office Action dated Sep. 25, 2017 in U.S. Appl. No. 13/623,043.
Office Action dated Sep. 27, 2022 in U.S. Appl. No. 17/313,374.
Office Action dated Sep. 30, 2016 in U.S. Appl. No. 14/194,551.
Office Action dated Oct. 7, 2015 in U.S. Appl. No. 13/381,166.
Office Action dated Oct. 8, 2015 in U.S. Appl. No. 13/623,043.
Office Action dated Nov. 2, 2018 in CN Patent Application No. 201580019008.5.
Office Action dated Nov. 20, 2015 in U.S. Appl. No. 14/194,551.
Office Action dated Nov. 20, 2020 in U.S. Appl. No. 16/257,013.
Office Action dated Nov. 24, 2020 in CN Patent Application No. 2019010521231.X.
Office Action dated Dec. 2, 2020 in CN Patent Application No. 201910521244.7.
Office Action dated Dec. 4, 2018 in KR Patent Application No. 10-2015-7010122.
Office Action dated Dec. 7, 2016 in U.S. Appl. No. 13/831,166.
Office Action dated Dec. 29, 2021 in CN Patent Application No. 201910521231.X.
Summons to Attend Oral Proceedings dated Jun. 8, 2021 in EP Patent Application No. 15710665.9.

* cited by examiner

SYSTEMS AND METHODS FOR OPERATING A SET TOP BOX

CROSS-REFERENCE TO RELATED APPLICATIONS

This application is a continuation of U.S. patent application Ser. No. 17/313,374, filed May 6, 2021, which is a continuation of U.S. patent application Ser. No. 16/257,013, filed Jan. 24, 2019, which is a continuation of U.S. patent application Ser. No. 15/835,350, filed Dec. 7, 2017, which is a continuation of U.S. patent application Ser. No. 14/194,551, filed Feb. 28, 2014, which is a continuation-in-part of U.S. patent application Ser. No. 14/089,709, filed on Nov. 25, 2013, which is a continuation-in-part of U.S. patent application Ser. No. 13/623,043, filed on Sep. 19, 2012, each of which is hereby incorporated by reference herein in its entirety.

This application relates to U.S. patent application Ser. No. 13/831,166, filed Mar. 14, 2013, which is hereby incorporated by reference herein in its entirety.

TECHNICAL FIELD

The disclosed implementations relate generally to systems, methods and devices configured to collect information about media content items, such as television listings and streaming (e.g., audio and/or video) programs, e.g., so as to improve, for a user, access to and control over devices (e.g., a set top box or a connected TV) for playing such media content items.

BACKGROUND

Interactive television technologies generally enable adding Internet-based functionality, content and/or services as an overlay to the television signals provided by cable and satellite television providers. For example, one of the aims of interactive television technologies is to deliver Internet-accessible functionality, content and/or services to an individual consumer that are matched to a particular television program the consumer is currently watching. To that end, interactive television technologies often need to determine what a consumer is watching in order to deliver matched functionality, content and/or services.

According to previously developed systems and methods, a second device, such as a supplemental set-top box or a connected TV, is configured to work with the primary set-top box provided by a cable, satellite or other network television provider. In order to determine what a consumer is watching, the supplemental set-top box sends a query to the primary set-top box requesting information about the currently playing television program selected by the consumer (e.g. the title, names of actors or characters, electronic program guide information, etc.). In order to send such a query or otherwise communicate with the primary set-top box, the supplemental set-top box usually includes one or more provider-specific application program interfaces (APIs) that enable the supplemental set-top box to be paired with a wide variety of primary set-top boxes from various cable and satellite television providers. A similar situation also applies to other possible interactions between a supplemental set-top box and a primary set-top box, such as checking whether the primary set-top box is on or off or adjusting the default configuration of the primary set-top box. The development of each API requires the input and cooperation of a respective cable or satellite television provider that provides a primary set-top box to consumers. Developing the APIs with various providers tends to be inefficient, and hinders scaling such technologies across a wide variety of provider-specific platforms.

In addition to TV content, other types of media content and services can be provided through a primary set-top box. The content or other services can be provided via a direct connection to the set-top box, as built-in features of the set-top box, or via a network connection. For example, a digital video recorder (DVR) built into a set-top box can be used to record TV content or playback recorded TV content; the set-top box can be used to access video-on-demand (VOD), DVD, or Blu-ray content available from the cable or satellite provider, a DVD player, or a Blu-ray player, respectively, associated with the set-top box; or the set-top box can be used to connect a local security system to security monitoring services. As noted above, it is challenging to develop and maintain APIs for every possible primary set-top box device that can be connected to a secondary set-top box. The variety of additional services that can be connected to a primary set top box makes the development of APIs to provide access to, or control of, such additional services even more challenging. Therefore, there is a need for solutions that enable a supplemental set-top box to receive information from other services provided via a primary set top box and to interact with (e.g., control) those services without using custom APIs for a particular primary set-top box.

SUMMARY

Various implementations of systems, methods and devices within the scope of the appended claims each have several aspects, no single one of which is solely responsible for the attributes described herein. Without limiting the scope of the appended claims, some prominent features are described. After considering this disclosure, and particularly after considering the section entitled "Detailed Description" one will understand how the features of various implementations are used to enable identifying and presenting, in real time, Internet-accessible and/or Internet-based functionality, content and/or services associated with a particular television program concurrently playing on a television or display.

One aspect of the disclosure is a computer-implemented method for controlling an electronic device. In some implementations, the method is performed by and at a first electronic device coupled to a display and a first output connection of a second electronic device, the first electronic device including one or more processors and memory. In some implementations, the method includes: sending a first command sequence to the second electronic device via a wireless connection different from the first output connection, wherein the first command sequence is not known to be correct; in response to the sending; capturing display data provided by the second electronic device via the first output connection; analyzing the display data to determine whether the first command sequence was performed correctly by the second electronic device; and when the first command sequence was not performed correctly, sending a second command sequence to the second electronic device via the wireless connection, wherein the second command sequence is not known to be correct.

In another aspect of the disclosure, some implementations further include: analyzing the display data to determine whether the second command sequence was performed correctly by the second electronic device; and when the second command sequence was performed correctly, updating a first database to identify the second command sequence as a correct command sequence for the second electronic device.

In another aspect of the disclosure, in some implementations, the second electronic device provides a plurality of features that cannot be controlled by the first electronic device via the first output connection. In some implementations, the second electronic device is a DVD player, a Blu-ray player, or a device that can be controlled by an (e.g., IR or RF) remote control and has a video output that can be plugged into the first electronic device.

In this situation, when the first and second command sequences are intended to control a first feature provided by the second electronic device, the disclosed methods further include: selecting the first command sequence and the second command sequence from a database of command sequences based on a device type of the first electronic device and a feature type of the first feature.

In another aspect of the disclosure, in some implementations, the second electronic device is a set top box and the plurality of features includes: video on demand services, digital video recorder services, and set top box services (e.g., so that the first electronic device can obtain a list of channels and programs available to the second electronic device and can control EPG menus of the second electronic device. In another aspect of the disclosure, the video on demand services include: selecting a video on demand selection for viewing. In another aspect of the disclosure, the digital video recorder services include one or more of: (a) scheduling a recording of a content item provided via the set top box, and (b) selecting for viewing a previously recording content item. In another aspect of the disclosure the set-top box services include one or more of: (a) checking an on/off state of the set top box, (b) checking a menu state of the set top box, (c) checking a provider associated with the set top box, and (c) setting a configuration of the set top box.

In another aspect of the disclosure, some implementations further include: displaying a user interface on the display providing selectable user options for interacting with a plurality of features provided by the second electronic device; responsive to user selection of an option associated with the first feature, selecting the second command sequence from the first database; and issuing the second command sequence to the second electronic device.

Another aspect of the disclosure is a computer-implemented method of controlling an electronic device, comprising: at a first electronic device coupled to a display and a first output connection of a second electronic device, the first electronic device including one or more processors and memory: sending a first command sequence to the second electronic device via a wireless connection different from the first output connection, wherein the first command sequence is selected to determine a first state of the second electronic device; in response to the sending, capturing display data provided by the second electronic device via the first output connection; analyzing the display data to determine the first state of the second electronic device; and based on the first state and a device type of the second electronic device, sending a second command sequence to the second electronic device so as to control a feature provided by the second electronic device.

In another aspect of the disclosure, the second electronic device is a set-top box and the plurality of features includes: video on demand services, digital video recorder services, and set top box services. In another aspect of the disclosure, the video on demand services include: selecting a video on demand selection for viewing. In another aspect of the disclosure, the digital video recorder services include one or more of: (a) scheduling a recording of a content item provided via the set top box, and (b) selecting for viewing a previously recording content item. In another aspect of the invention, the set top box services include one or more of: (a) checking an on/off state of the set top box, (b) checking a menu state of the set top box, (c) checking a provider associated with the set top box, and (c) setting a configuration of the set top box.

One aspect of the disclosure is a system for controlling an electronic device. In some implementations, the system includes a first electronic device coupled to a display and a first output connection of a second electronic device, the first electronic device including one or more processors and memory storing instructions for execution by the first electronic device. In some implementations, the instructions are for: sending a first command sequence to the second electronic device via a wireless connection different from the first output connection, wherein the first command sequence is not known to be correct; in response to the sending; capturing display data provided by the second electronic device via the first output connection; analyzing the display data to determine whether the first command sequence was performed correctly by the second electronic device; and when the first command sequence was not performed correctly, sending a second command sequence to the second electronic device via the wireless connection, wherein the second command sequence is not known to be correct.

Another aspect of the disclosure is a system for an electronic device. In some implementations, the system includes a first electronic device coupled to a display and a first output connection of a second electronic device, the first electronic device including one or more processors and memory storing instructions for execution by the first electronic device. In some implementations, the instructions are for: sending a first command sequence to the second electronic device via a wireless connection different from the first output connection, wherein the first command sequence is selected to determine a first state of the second electronic device; in response to the sending, capturing display data provided by the second electronic device via the first output connection; analyzing the display data to determine the first state of the second electronic device; and based on the first state and a device type of the second electronic device, sending a second command sequence to the second electronic device so as to control a feature provided by the second electronic device.

Another aspect of the present disclosure includes a non-transitory computer readable storage medium storing one or more programs for executing by one or more processors of a first electronic device. In some implementations, the first electronic device includes one or more processors and memory and is coupled to a display and a first output connection of a second electronic device. The one or more programs, when executed by the by the first electronic device, cause the first electronic device to perform the method of: sending a first command sequence to a second electronic device via a wireless connection different from a first output connection. The first command sequence is not known to be correct. The method further includes, in response to the sending, capturing display data provided by the second electronic device via the first output connection; and analyzing the display data to determine whether the first command sequence was performed correctly by the second electronic device. When the first command sequence was not performed correctly, sending a second command sequence to the second electronic device via the wireless connection. In some implementations, the second command sequence is not known to be correct.

In some implementations, the one or more programs further include instructions for analyzing the display data to determine whether the second command sequence was performed correctly by the second electronic device; and when the second command sequence was performed correctly, updating a first database to identify the second command sequence as a correct command sequence for the second electronic device.

In some implementations, the first output connection of the second device is a one-way connection from the second electronic device to the first electronic device.

In some implementations, the first output connection provides video and audio data corresponding to features provided by the second electronic device.

In some implementations, the second electronic device provides a plurality of features that cannot be controlled by the first electronic device via the first output connection, the one or more programs further comprise instructions for: when the first and second command sequences are intended to control a first feature provided by the second electronic device, selecting the first command sequence and the second command sequence from a database of command sequences based on a device type of the first electronic device and a feature type of the first feature.

In some implementations, the second electronic device is a set top box and the plurality of features includes: video on demand services, digital video recorder services, EPG services, and set top box services.

In some implementations, the video on demand services include: selecting a video on demand selection for viewing.

In some implementations, the digital video recorder services include one or more of: (a) scheduling a recording of a content item provided via the set top box, (b) selecting for viewing a previously recording content item, (c) retrieving the list of programmed recording for determining user preferences, (d) modifying scheduling of a recording, and (e) deleting a recording of a content item.

In some implementations, the set-top box services include one or more of: (a) checking an on/off state of the set top box, (b) checking a menu state of the set top box, (c) checking a provider associated with the set top box, and (d) setting or determining a configuration of the set top box.

In some implementations, one or more programs further include instructions for: displaying a user interface on the display providing selectable user options for interacting with a plurality of features provided by the second electronic device; responsive to user selection of an option associated with the first feature, selecting the second command sequence from the first database; and issuing the second command sequence to the second electronic device.

In some implementations, analyzing the display data to determine whether the first command sequence was performed correctly by the second electronic device includes: based on a device type of the second electronic device and a feature type of a first feature intended to be controlled by the first command sequence: accessing a database of expected display responses, wherein the database of expected display responses indicates two or more of: (a) position, (b) bounding box locations, and (c) content of display information provided by the second electronic device for respective feature types; determining from the database of expected display responses a first expected display response associated with the first feature; comparing the captured display data to the first expected display response; and determining based on an outcome of the comparison whether the first command sequence was performed correctly by the second electronic device.

In some implementations, the one or more programs further include instructions for: in response to the sending, capturing audio data provided by the second electronic device via the first output connection; and analyzing the audio data in combination with the display data to determine whether the first command sequence was performed correctly by the second electronic device.

In some implementations, the one or more programs further include instructions for: when a particular device type of the second electronic device is unknown: analyzing the display data to determine whether the second command sequence was performed correctly by the second electronic device; and when the second command sequence was performed correctly by the second electronic device; updating a third database to indicate that the second electronic device is the particular device type.

In some implementations, analyzing the display data is performed at least in part at a server with which the first electronic device is in communication.

Another aspect of the present disclosure includes a non-transitory computer readable storage medium storing one or more programs for executing by one or more processors of a first electronic device. In some implementations, the first electronic device includes one or more processors and memory and is coupled to a display and a first output connection of a second electronic device. The one or more programs, when executed by the by the first electronic device, cause the first electronic device to perform the method of: sending a first command sequence to the second electronic device via a wireless connection different from the first output connection. The first command sequence is selected to determine a first state of the second electronic device. The method further includes, in response to the sending, capturing display data provided by the second electronic device via the first output connection; analyzing the display data to determine the first state of the second electronic device; and based on the first state and a device type of the second electronic device, sending a second command sequence to the second electronic device so as to control a feature provided by the second electronic device.

In some implementations, the second electronic device is a set-top box and the plurality of features includes: video on demand services, digital video recorder services, set top box services, and EPG services.

In some implementations, the video on demand services include: selecting a video on demand selection for viewing.

In some implementations, the digital video recorder services include one or more of: (a) scheduling a recording of a content item provided via the set top box, and (b) selecting for viewing a previously recording content item.

In some implementations, the set top box services include one or more of: (a) checking an on/off state of the set top box, (b) checking a menu state of the set top box, (c) checking a provider associated with the set top box, and (c) setting a configuration of the set top box.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent

Figure 1A:
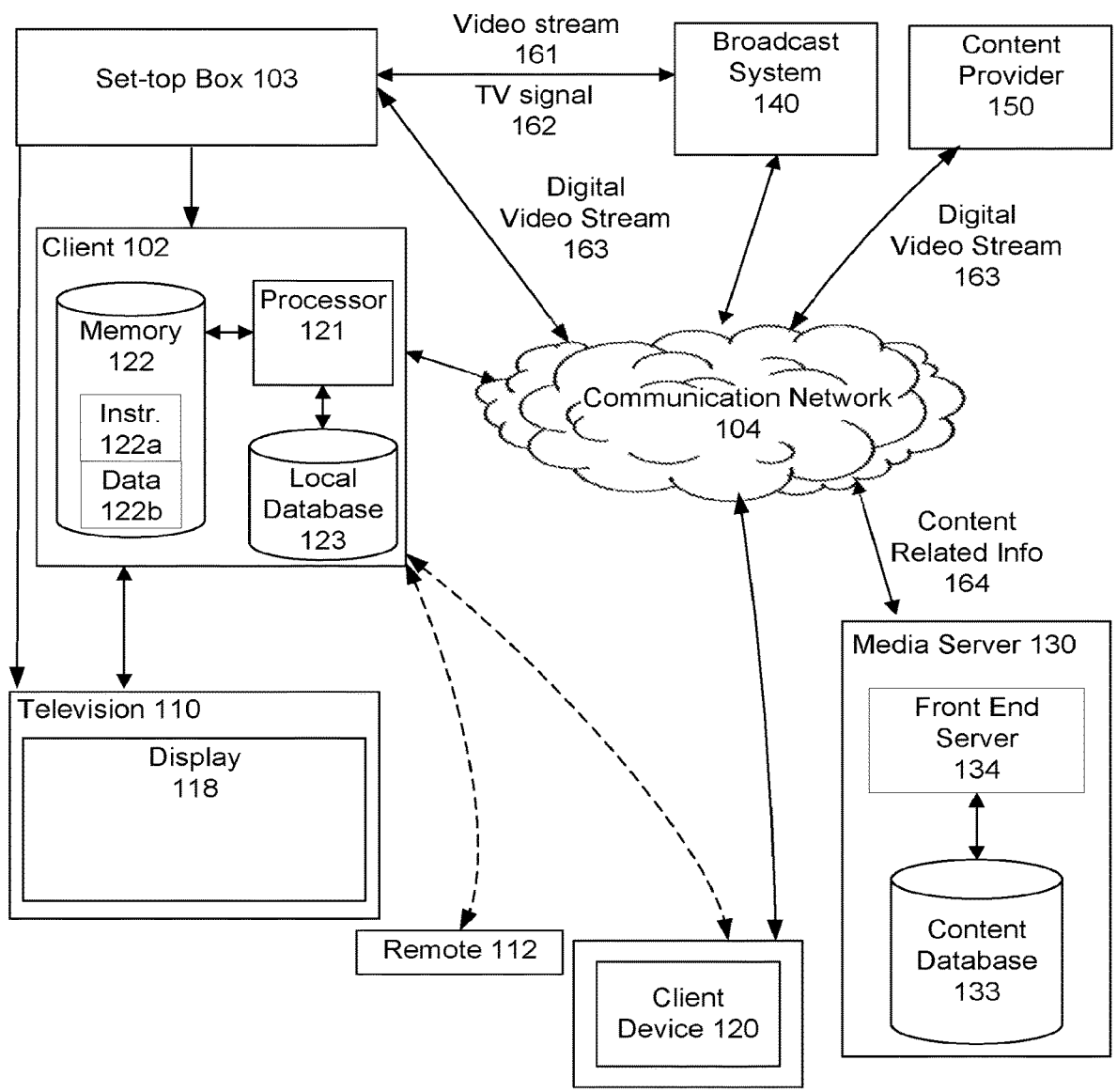
FIG. 1A is a diagram of an implementation of a client-server environment.

In accordance with common practice the various features illustrated in the drawings may not be drawn to scale. Accordingly, the dimensions of the various features may be arbitrarily expanded or reduced for clarity. In addition, the drawings may not depict all of the components of a given system, method or device; because, known methods, components, and circuits have not been described in exhaustive detail. Finally, like reference numerals may be used to denote like features throughout the specification and figures.

DETAILED DESCRIPTION

The various implementations described herein include systems, methods and/or devices that are enabled to determine what a particular consumer is watching on television in order to deliver matched functionality, content and/or services, as a part of an interactive television suite of technologies. In particular, in some implementations, the process of determining what a particular consumer is watching is enabled so that communication between the primary set-top box and a supplemental set-top box and/or television-integrated device is reduced, thereby avoiding the need for one or more provider specific APIs. For example, one aspect of the disclosure is a method of identifying a media program by capturing display data from the media program, and extracting text from the display data in response to determining that the display data includes the text overlay, wherein the extracted text is associated with the media program. In some cases, a media program is identified by (1) generating one or more content fingerprints from a portion (e.g., audio or video) of the media content program, and (2) comparing the one or more content fingerprints with a set of fingerprints corresponding to (e.g., extracted from) a known media program.

Additionally and/or alternatively, in some implementations, a supplemental set-top box (or television integrated device) is configured to operate a primary set-top box, without a provider-specific API, in order to determine the channel line-up available to a particular subscriber through the primary set-top box. In addition, in some implementations, similar methods and features can be used to identify channel lineups available to viewers of non-subscription media content, such as over the air broadcasts that are received by a TV receiver, such as a TV receiver included, without limitation, in a computer, a media player, such as a DVD or Blu-ray player, or a digital video recorder (DVR). In some implementations, it is useful to make control of the menus of a second device from a first device more reliable, even if the second device does not provide access to TV program. These methods are advantageous, because they make universal remote controls more reliable.

A common factor in each of these situations is that the supplemental set-top box does not have direct knowledge of the TV channels that are available to the primary set-top box or other TV receiver. Consequently, the supplemental set top box needs to implement indirect strategies to identify a TV channel that is being tuned by, or entire channel lineup available to, the primary set-top box or other TV receiver.

Numerous details are described herein in order to provide a thorough understanding of the example implementations illustrated in the accompanying drawings. However, the invention may be practiced without these specific details. And, well-known methods, procedures, components, and circuits have not been described in exhaustive detail so as not to unnecessarily obscure more pertinent aspects of the example implementations.

FIG. 1A is a diagram of an implementation of a client-server environment 100. While certain specific features are illustrated, those skilled in the art will appreciate from the present disclosure that various other features have not been illustrated for the sake of brevity and so as not to obscure more pertinent aspects of the implementations disclosed herein. To that end, the client-server environment 100 includes a set-top box 103, a television (TV) 110, a client device 102 (e.g., a supplemental set-top box), a second screen client device 120 (e.g. a laptop, a tablet computer, a smartphone, etc.), a remote control device 112, a communication network 104, a media server 130, a broadcast system 140, and a content provider 150. The second screen client device 120, the client device 102, the media server 130, the broadcast system 140, and the content provider 150 are capable of being connected to the communication network 104 in order to exchange information with one another and/or other devices and systems. The client-server environment 100 is merely an example provided to discuss more pertinent features of the present disclosure. Those skilled in the art will appreciate from the present disclosure that any number of such devices and/or systems may be provided in a client-server environment, and particular devices may be altogether absent.

In some implementations, the media server 130 is implemented as a single server system, while in other implementations it is implemented as a distributed system of multiple servers. Solely for convenience of explanation, the media server 130 is described below as being implemented on a single server system. Similarly, in some implementations, the broadcast system 140 is implemented as a single server system, while in other implementations it is implemented as a distributed system of multiple servers. Solely, for convenience of explanation, the broadcast system 140 is described below as being implemented on a single server system. Similarly, in some implementations, the content provider 150 is implemented as a single server system, while in other implementations it is implemented as a distributed system of multiple servers. Solely, for convenience of explanation, the content provider 150 is described below as being implemented on a single server system. Moreover, the functionality of the broadcast system 140 and the content provider 150 can be combined into a single server system. Additionally and/or alternatively, while only one broadcast system and only one content provider is illustrated in FIG. 1A for the sake of brevity, those skilled in the art will appreciate from the present disclosure that fewer or more of each may be present in an implementation of a client-server environment.

In some implementations, the second screen client device 120 (e.g. a tablet computer or laptop, etc.), the set-top box 103, the TV 110, the client device 102, and a remote control 112 are provided in combination within, for example, a home or commercial establishment. The set-top box 103 is configured to receive and decode signals including media content from the broadcast system 140 or the like. In operation, the set-top box 103 decodes the signal received from the broadcast system 140 or the like and provides audio and video content to the TV 110 for display. While a TV has been used in the illustrated example, those skilled in the art will appreciate from the present disclosure that any number of displays devices, including computers, laptop computers, tablet computers, smart-phones and the like, can be used to display a video stream and play the associated audio stream. Additionally and/or alternatively, in some implementations the functions of the set-top box 103 and the TV 110 are combined into a single device.

In some implementations, the remote control 112 is used to control the operation of one or more of the set-top box 103, the TV 110, and the client device 102. In one mode of operation, the client device 102 monitors the display 118 of the TV 110 to determine when a program information overlay is provided. In another mode of operation, the client device 102 emulates the function of the remote control device 112 (e.g., by sending IR commands via an IR blaster 125 (FIG. 1B)) to prompt the set-top box 103 to display the program information overlay. And in yet another mode of operation, the client device 102 receives IR transmissions from the remote control 112 that are directed to the set-top box 103. In turn, the client device 102 may then communicate with any one of the media monitoring server 130, the broadcast system 140, and the content provider 150 through the communication network 104. More specific details pertaining to how the client device 102 acquires real time program information related to what a particular user is watching is described below with reference to FIGS. 3-5.

In some implementations, the set-top box 103 is any computer device capable of connecting to the communication network 104, receiving video streams, extracting information from video streams and presenting video streams for the display using the TV 110 (or another display device). In some implementations, the set-top box 103 is configured as a receiver for cable TV and/or satellite TV, a digital video recorder (DVR), a digital media receiver, a TV tuner, a computer, and/or any other device that outputs TV signals. In some implementations, the TV 110 is a conventional TV display that is not connectable to the Internet and that displays digital and/or analog TV content received via over the air broadcasts or a satellite or cable connection.

Similarly, in some implementations the client device 102 is any computer device capable of connecting to the communication network 104 and the TV 110. As described below with reference to FIG. 5, in some implementations, the client device 102 is capable of receiving infrared (IR) transmissions directed to the set-top box 103 from the remote control device 112. Additionally and/or alternatively, in some implementations, the client device 102 is capable of wired and/or wireless communication with the client device 120. In some implementations, the client device 102 includes one or more processors 121, non-volatile memory 122 such as a hard disk drive, and a local database 123. In some implementations, the memory 122 includes application instructions 122a and associated data 122b. In some implementations, the local database 123 and/or the associated data 122b stores information related to local channel lineups, including one or more local channel lineups 180-i discovered through operations described herein. In some implementations, the operations are performed by the application instructions 122a.

As discussed in greater detail below, the processor 121 executes the one or more applications in accordance with a set of instructions received from the media monitoring server 130. The client device 102 may also have input devices such as a keyboard, a mouse and/or track-pad (not shown). In some implementations, the client device 102 includes a touch screen display, a digital camera and/or any number of supplemental devices to add functionality.

As is typical of televisions, the TV 110 includes a display 118 and speakers. Additionally and/or alternatively, the TV 110 can be replaced with another type of display device for presenting video content to a user, such as for example, a computer, a tablet device, a mobile telephone, a projector, or other type of video display system. The display device can be coupled to the set-top box 103 via a wireless or wired connection.

As used herein, a TV signal is an electrical, optical, or other type of data transmitting medium that includes audio and/or video components corresponding to a TV channel. In some implementations, the TV signal is a terrestrial over-the-air TV broadcast signal or a sign distributed/broadcast on a cable-system or a satellite system. In some implementations, the TV signal is transmitted as data over a network connection. For example, the set-top box 103 can receive video streams from an Internet connection. Audio and video components of a TV signal are sometimes referred to herein as audio signals and video signals. In some implementations, a TV signal corresponds to a TV channel that is being displayed on the TV 110.

Figure 1B:
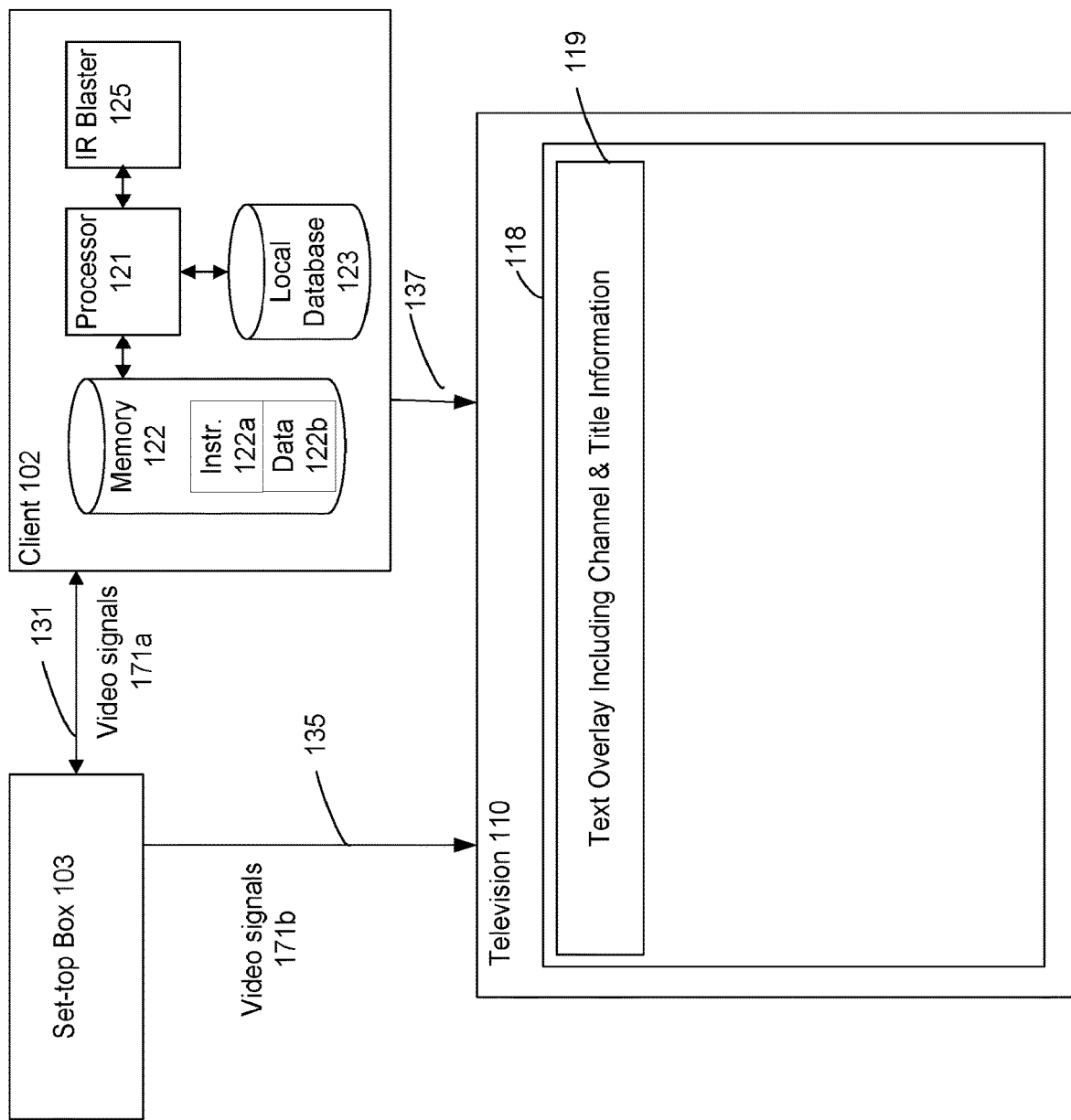
FIG. 1B is a diagram of a portion of the client-server environment including an example schematic screen display on a television.

FIG. 1B is a diagram of a portion of the client-server environment 100 including an example schematic screen display on the TV 110. Again, the TV 110 includes the display 118 on which video of a media program is displayed. Further, while the video is being displayed, the set-top box 103 may provide a text overlay 119 that includes channel and title information. For example, the text overlay 119 typically includes the channel the media program is being presented on, as well as the title of the media program. The text overlay 119 also often includes information about actors, characters, and/or a synopsis of the media program. In some implementations, as shown in FIG. 1B, the client 102 is connected to the set-box 103 via a connection 131

(e.g., an HDMI, connection, a cable connection, or a wireless connection) by which the client 102 can receive video signals 171*a* from the set top box 103 the same as or comparable to the video signals 171*b* provided by the set top box 103 to the television 110 via the connection 135 (e.g., an HDMI connection). This allows the client 102 to analyze and perform optical character recognition (OCR) on the text overlay 119 provided by the set top box 103 along with the video and/or audio content and/or metadata associated with the show being watched (all provided as part of the video signals 171). In some implementations, the connections 131, 135 between the set top box 103 and the TV 110 and/or the client 102 are substantially or entirely one way. That is, while it is possible for the set top box 103 to provide signals to the TV 110 and the client 102, it is not possible for the TV 110 and the client 102 to control the set top box 103 via commands sent back to the set top box 103 via the connections 131 and 135. In some implementations, the client 102 is connected with the television 110 via the connection 137 (e.g., a wireless connection, such as a WIFI, BLUETOOTH, RF, or IF connection).

With further reference to FIG. 1A, the second screen client device 120 may be any computer device that is capable of connecting to the communication network 104, such as a computer, a laptop computer, a tablet device, a netbook, an Internet kiosk, a personal digital assistant, a mobile phone, a gaming device, or any other device that is capable of communicating with the media server 130.

The communication network 104 may be any combination of wired and wireless local area network (LAN) and/or wide area network (WAN), such as an intranet, an extranet, including a portion of the Internet, or a wireless network provided by a wireless carrier. It is sufficient that the communication network 104 provides communication capability between the second screen client device 120 and the media monitoring server 130. In some implementations, the communication network 104 uses the HyperText Transport Protocol (HTTP) to transport information using the Transmission Control Protocol/Internet Protocol (TCP/IP). HTTP permits the client device 102 to access various resources available via the communication network 104. However, the various implementations described herein are not limited to the use of any particular protocol.

In some implementations, the media monitoring server 130 includes a front end server 134 that facilitates communication between the media monitoring server 130 and the communication network 104. The front end server 134 receives content information from the client device 102. As described in greater detail below, in some implementations, the content information includes program information, such as the program title, actor names, character names, plot summaries, etc. In some implementations, the front end server 134 is configured to send a set of instructions to the client device 102. In some implementations, the front end server 134 is configured to send content files, links to content files and/or metadata associated with the content files. The term "content file" includes any document or content of any format including, but not limited to, a video file, an image file, a music file, a web page, an email message, an SMS message, a content feed, an advertisement, a coupon, a playlist or an XML document. In some implementations, the front end server 134 is configured to send or receive one or more video streams. In some implementations, the front end server 134 is configured to receive content directly from the broadcast system 140 and/or the content provider 150 over the communication network 104.

In some implementations, the media monitoring server 130 includes a content database 136. In some implementations, the content database 136 includes advertisements, videos, images, music, web pages, email messages, SMS messages, content feeds, advertisements, coupons, playlists, XML documents, and ratings associated with various media content or any combination thereof. In some implementations, the content database 136 includes links to advertisements, videos, images, music, web pages, email messages, SMS messages, content feeds, advertisements, coupons, playlists, XML documents and ratings associated with various media content. In some implementations, the content database 136 is a distributed database.

In some implementations, the broadcast system 140 includes media content such as TV programs. In some implementations, the broadcast system 140 also includes metadata associated with one or more of the TV programs, and application program interface instructions. In some implementations, the application program interface instructions include instructions that can be provided to a client device and/or may be executed by the broadcast system 140 under a client-server model or the like in order to link a particular TV program with the associated metadata and/or link the TV program and the associated metadata with external data and/or services, such as a social networking application. Similarly, in some implementations, the content provider 150 additionally and/or alternatively includes media content such as TV programs, as well as metadata associated with one or more of the TV programs.

Figure 2A:
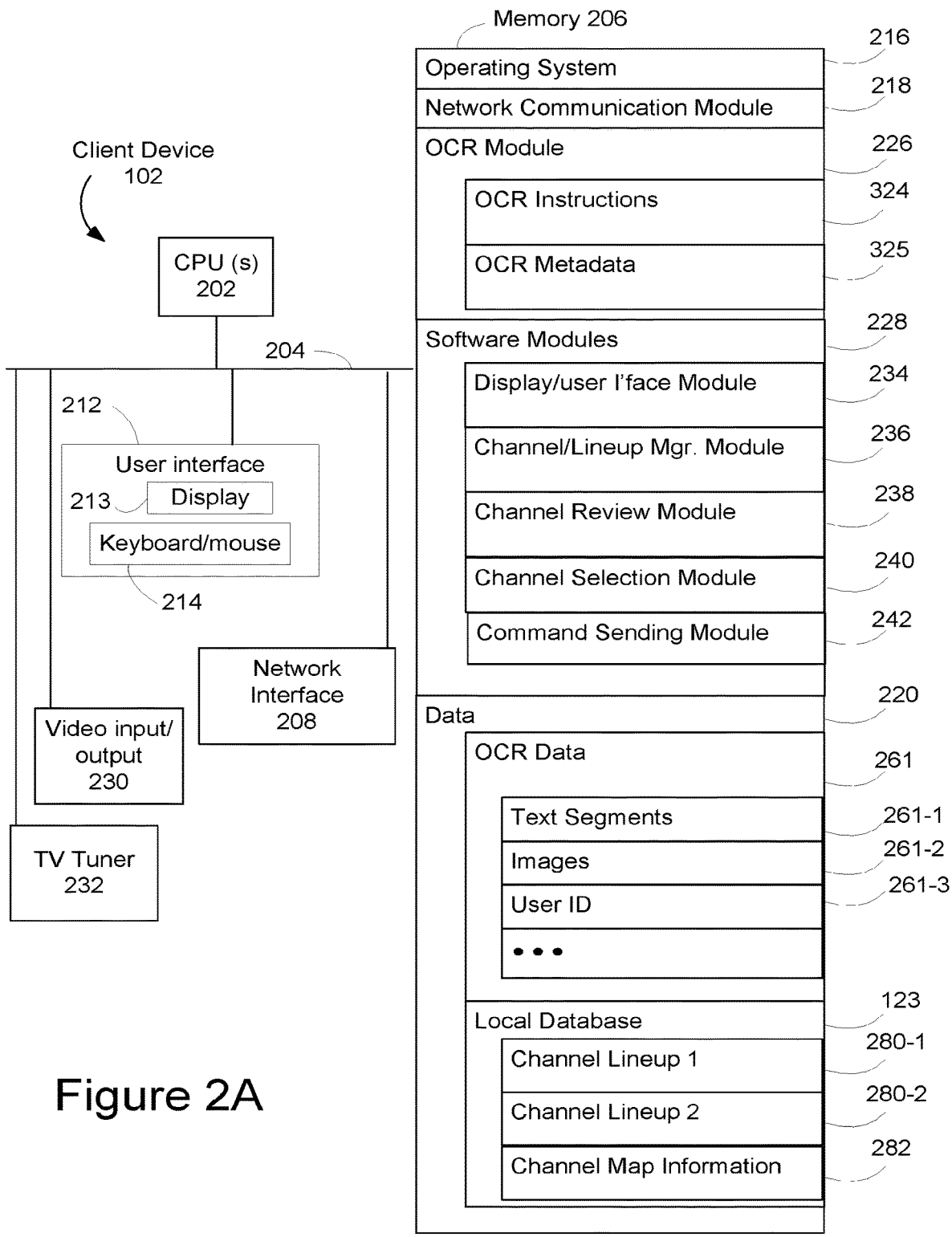
FIG. 2A is a diagram of an example implementation of a client device operable as a supplemental set-top box and/or a television-integrated device.

FIG. 2A is a diagram of an example implementation of the client device 102, discussed above with reference to FIG. 1A, and which may be operable as a supplemental set-top box and/or a television-integrated device. While certain specific features are illustrated, those skilled in the art will appreciate from the present disclosure that various other features have not been illustrated for the sake of brevity and so as not to obscure more pertinent aspects of the implementations disclosed herein. To that end, the client device 102 includes one or more processing units (CPU's) 202, one or more network or other communications interfaces 208, memory 206, a TV tuner 232, a video I/O 230, and one or more communication buses 204, for interconnecting these and various other components. The communication buses 204 optionally include circuitry (sometimes called a chipset) that interconnects and controls communications between system components. The client device 102 may also include a user interface 212 comprising a display device 213 and a keyboard and/or mouse (or other pointing device) 214 and/or a remote control (etc.). Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternatively the non-volatile memory device(s) within memory 206, comprises a non-transitory computer readable storage medium. In some implementations, memory 206 or the computer readable storage medium of memory 206 store the following programs, modules and data structures, or a subset thereof, an operating system 216, a network communication module 218, an OCR module 226, software modules 228, and data 220.

The operating system 216 includes procedures for handling various basic system services and for performing hardware dependent tasks.

The network communication module 218 facilitates communication with other devices via the one or more communication network interfaces 204 (wired or wireless) and one or more communication networks, such as the Internet, other wide area networks, local area networks, metropolitan area networks, and so on.

In some implementations, the OCR module 226 enables the client device 102 to process screen shots (e.g. images from the TV 110) to obtain the program information included in the program information overlay provided by the primary set-top box 103. To that end, the OCR module 226 includes OCR instructions 324 and metadata 325. In some implementations, the OCR instructions 324 include instructions that perform OCR operations to recognize program information from TV images and content and the metadata 325 includes data employed by the OCR module to support OCR operations. For example, in some implementations the metadata includes information related to common combinations of words associated with TV channels and programs, such as channel names, broadcaster names, and words commonly used in program titles. In some implementations, e.g., when the client 102 is equipped with appropriate processing power, screen shots are processed locally on the client 102, e.g., so as to avoid delay caused by transmitting the screen shots to a remote sever.

In other implementations, processing screen shots (e.g., one or more of the OCR operations) take place on a server computer connected with the client 102, e.g., via the communication network 104. In some implementations, the client 102 transmits unprocessed (e.g., raw) or partially processed screenshots to a server for processing. In some implementation, the client 102 compresses (e.g., applying one or more compression algorithms, lossy or lossless) or adjusts (e.g., transmitting black and white images) the screen shots, e.g., so as to consume less network bandwidth.

In still other implementations, where load balancing techniques are used, screen shot processing (e.g., one or more of the OCR operations) take place partially on the client 102 and partially on a server computer. For example, in a set of 10 screen shots, high resolution screen shots processed locally (e.g., so as to avoid a potentially lengthy transmission delay), and low resolution screen shots are transmitted to a server for batch processing, which are usually quicker. For another example, in a set of 1000 screen shots, the first 500 screen shots are processed locally, while the second 500 screen shots are transmitted to a server for parallel or concurrent processing, e.g., so as to reduce overall processing time.

In still further implementations, some stages of screen shot processing take place on a client, while other stages take place on a server. For example, after a screen shot is taken, a client applies OCR techniques to the screen shot, and resulting text (produced by the OCR techniques), and/or associated annotations, are sent to a remote server, which then decides what instructions execute on a set top box (e.g., a channel switch, recording a user preference, and displaying a channel listing).

In some implementations, the software modules include a display/user module 234, a channel lineup manager module 236, a channel review module 238, and a channel selection module 240. In some implementations, the display/user module 234 displays information provided by other software modules. The displayed information can include a channel lineup 280 discovered by some combination of the OCR module 226, channel lineup manager module 436, channel review module 238, channel selection module 240, and a command sending module 242.

In some implementations, for some functions such as changing channels (e.g., to extract channel lineup), a process sometimes called (audio or video) fingerprinting is used in lieu of OCR techniques. In these implementations, the client 102 includes a shared capture module (or infrastructure) that captures audio or video content on all live channels. The captured fingerprints are then extracted (by the client 102 or by a server computer). For example, when a first electronic device (e.g., the set-top box 103 or the television 110) tunes to a particular channel, a second electronic device (e.g., the client 102 or the media server 130) computes a fingerprint from a portion of audio or video content coming from the first electronic device. The fingerprint is sent to a server, which compares the fingerprint from the first device with the captured fingerprint. If there is no match, this is an indication that the channel is not available or that the tuning failed (e.g., a bad IR code). If there is a match, the specific channel can be added to the lineup.

In some implementations, the channel lineup manager module 236 maps the discovered channel numbers to actual over the air channels as applicable and to cable channel names (e.g., by using the channel map information 282). The channel review module 238 enables a user to review, correct and remove channel information. In some implementations, the channel selection module 440 detects tuned signal strength and identifies whether a tuned channel is presenting non-superfluous content—i.e., anything that is not noise. In some implementations, the channel selection module 240 also allows a user to tune channels on the TV using simple channel up/down commands, or by entering an actual channel no., and causes appropriate channel information to be displayed on the TV. In some implementations, the channel selection module 440 employs an IR blaster 125 (FIG. 1B) to send appropriate channel tuning/selection and "info" commands to the STB (or alternatively, the TV 110). In some implementations, the channel selection module 240 and other modules or operations described herein that interact with the IR blaster 125 to send commands to the TV 110 or the STB 125 do so via a command sending module 242. Thus, using the recognized channel lineup information, a user is able to control the TV 110 via the client device 102 (which only possesses a one-way connection to TV and the STB) as if the client device 102 possessed a two-way connection to the TV, similar to that of the STB 103.

In some implementations, since channel information is not provided to the client device 102 via the connection with the set top box 103, presenting channel information requires the client 102 or an interconnected sever to perform fingerprinting (e.g., of audio or video content snippets from media content played on the television 110) to confirm that the correct channel has been selected. This also means that the client device 102 needs to be able to issue an appropriate number of channel "Up" or "Down" commands (e.g., IR commands sent using the IR blaster 12 (FIG. 1B)) to the cable/set top box 103 (FIG. 1B) to navigate to the desired channel and then confirm that the correct channel has been arrived at. In some implementations, this is done by: (1) sending an "Info" IR command (similar to a user hitting the "Info" button on the TV remote control) and doing a quick OCR check of the resulting displayed on screen information—or (2) by fingerprinting the channel content confirm that it matches what the requested channel selection should be showing.

In some implementations, the display/user module 234 displays information provided by other software modules. The displayed information can include a channel lineup 180 discovered by some combination of the OCR module 226, channel lineup manager module 236, channel review module 238 and a channel selection module 240. In some implementations, the data 220 includes OCR data 261 and a local database 123 of program information. In some implementations, the program information is received from a broadcast system and/or content provider. In some implementations, the OCR data 261 includes text segments 261-1, images 261-2 and user ID information 261-3. In some implementations, the local database 123 includes one or more discovered channel lineups 280-i and channel map information 282 that stores information that maps channel numbers to actual over the air channels as applicable and to cable channel names.

In some implementations, each of the above identified elements may be stored in one or more of the previously mentioned memory devices, and each of the modules or programs corresponds to a set of instructions for performing a function described above. The set of instructions can be executed by one or more processors (e.g., the CPUs 202). The above identified modules or programs (i.e., sets of instructions) need not be implemented as separate software programs, procedures or modules, and thus various subsets of these modules may be combined or otherwise re-arranged in various implementations. In some implementations, memory 206 stores a subset of the modules and data structures identified above. Furthermore, memory 206 may store additional modules and data structures not described above.

Figure 2B:
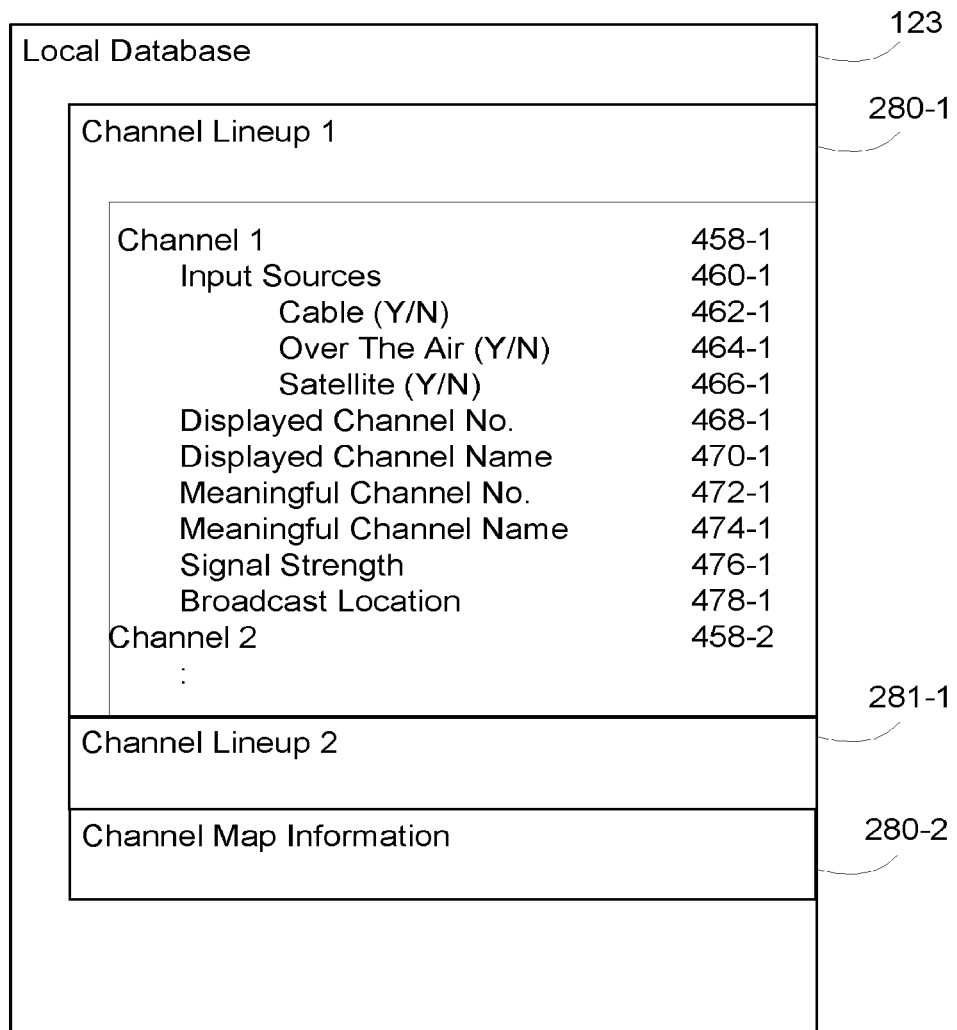
FIG. 2B is a diagram showing additional details of the Local Database.

FIG. 2B shows information associated in some implementations with individual channels 458 saved in a channel lineup 280-1 stored in the local database 123. This information, or subsets or supersets thereof, can be associated with any number of one or more of the channel lineups 280-i. In the illustrated implementation(s), a representative first channel lineup 280-1 includes, for an individual channel 458-1 in the lineup, one or more of: input source information 460-1, displayed channel number 468-1, displayed channel name 470-1, meaningful channel number 472-1, meaningful channel name 474-1, signal strength 476-1 and broadcast location 478-1. In some implementations, the input sources 460-1 indicate the source of a respective particular channel using Yes/No or similar binary values. In some implementations the input sources 460-1 indicate whether the tuned channel is from a cable provider 462-1, an over the air source 464-1 (such as a terrestrial broadcast TV channel) or from a satellite source 468-1. Alternatively, the input sources 460-1 can be represented with a single field that holds a value that indicates the source for the respective channel (e.g. "OTA," "Cable," or "Satellite-Dish"). The displayed channel number 468-1 and name 470-1 are the channel number and name displayed on the TV display 110 (FIG. 1B) and captured via OCR operations. The displayed channel number 468-1 and name 470-1 might not be meaningful to a user (e.g., the channel number 468-1 could be a three digit value assigned by a cable company with no relationship to a known channel number). As a result, the channel information includes in some implementations, for each tuned channel, a meaningful channel number 472-1 (e.g., a recognizable over the air channel number) and channel name 474-1 (e.g., a recognizable network or channel name). The channel information for a representative channel 458-1 also includes in some implementations information related to channel reception and transmission, including signal strength 476-1 and broadcast location 478-1.

Figure 3:
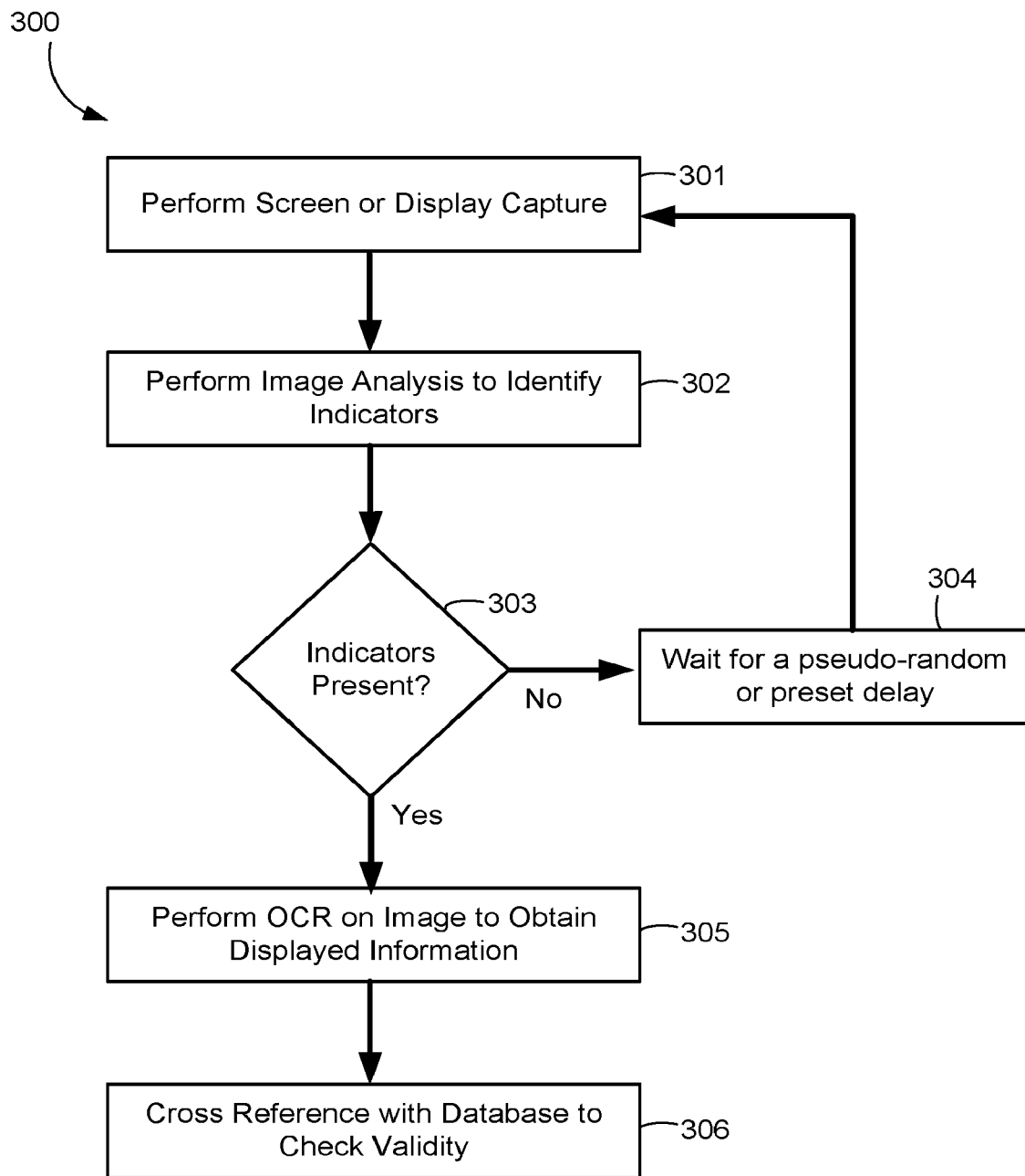
FIG. 3 is a flowchart representation of an implementation of a method of determining what a consumer is currently watching.

FIG. 3 is a flowchart representation of an implementation of a method 300 of determining what a consumer is currently watching. In some implementations, the method is performed by a device, such as a supplemental set-top box and/or a television integrated module, in order to enable determining what a consumer is currently watching. For example, with reference to FIG. 1A, in some implementations, the method 300 is performed by the client device 102 (i.e., the supplemental set-top box). As noted above, when a user changes the channel or requests program information by, for example, using one or more channel selection options or pressing an "INFO" button, the primary set-top box displays an overlay including program information, such as the current channel, the title of the playing program and information about the program. Accordingly, the method includes identifying instances during which the primary set-top box provides the overlay by monitoring the display output provided by the primary set-top box, and parsing the overlay for the desired information. Additionally and/or alternatively, in some implementations, the method includes detecting when channel identifiers are displayed without being prompted by user interaction (i.e., a user pressing a button)

To that end, the method includes performing a screen or display data capture from the display device that is displaying the television program selected by the consumer through a primary set-top box or the like in order acquire an image of what is being displayed (301). In some implementations, the screen capture data is obtained from the video signal provided by the primary set-top box. Additionally and/or alternatively, in some implementations, the screen capture data is obtained from a display (i.e., video) card included in the set-top box and/or the operating system of the set-top box. Additionally and/or alternatively, the screen capture data is obtained from a TV app running on at least one of the primary set-top box, the supplemental set-top box, the TV, and a second screen device. Additionally and/or alternatively, in some implementations, the supplemental set-top box (or the like) includes a camera operable to capture an image of the display of a television or the like. The method includes analyzing the image to identify whether the image includes indicators that an overlay is being displayed by the primary set-top box (302). For example, in some implementations, the indicators include the color of the overlay, the percentage of display area the overlay typically covers when visible, the arrangement of text with the overlay, contrast between a portion of the display likely to be displaying the program and another portion of the display likely to be displaying the overlay.

The method includes determining whether one or more of the indicators are present as indicated by the image analysis (303). If none of the indicators are present for a particular screen capture ("No" path from 303), the method includes waiting a pseudo-random amount of time or a preset delay time (304) before capturing another screen shot or the like. On the other hand, if at least one indicator is present or another threshold number of the indicators is present ("Yes" path from 303), the method includes applying an optical character recognition technique to the image in order to identify and extract the displayed information (305). Having extracted the title and/or program information, the method includes cross-referencing the extracted information with a local and/or remote database to ensure the validity of the information (306). For example, with further reference to FIG. 1A, the client device 102 may communicate with the media server 130 in order to check the validity of the extracted display information. More specifically, the client device 102 may transmit all or a portion of the extracted information to the media server 130. In turn, the media server 130 may then check the extracted information against a content database (e.g., the content database 133, FIG. 1) to ensure that the extracted data is correct and/or provide corrected information to the client device 102 when the extracted data is incorrect but can be matched to database information.

Figure 4:
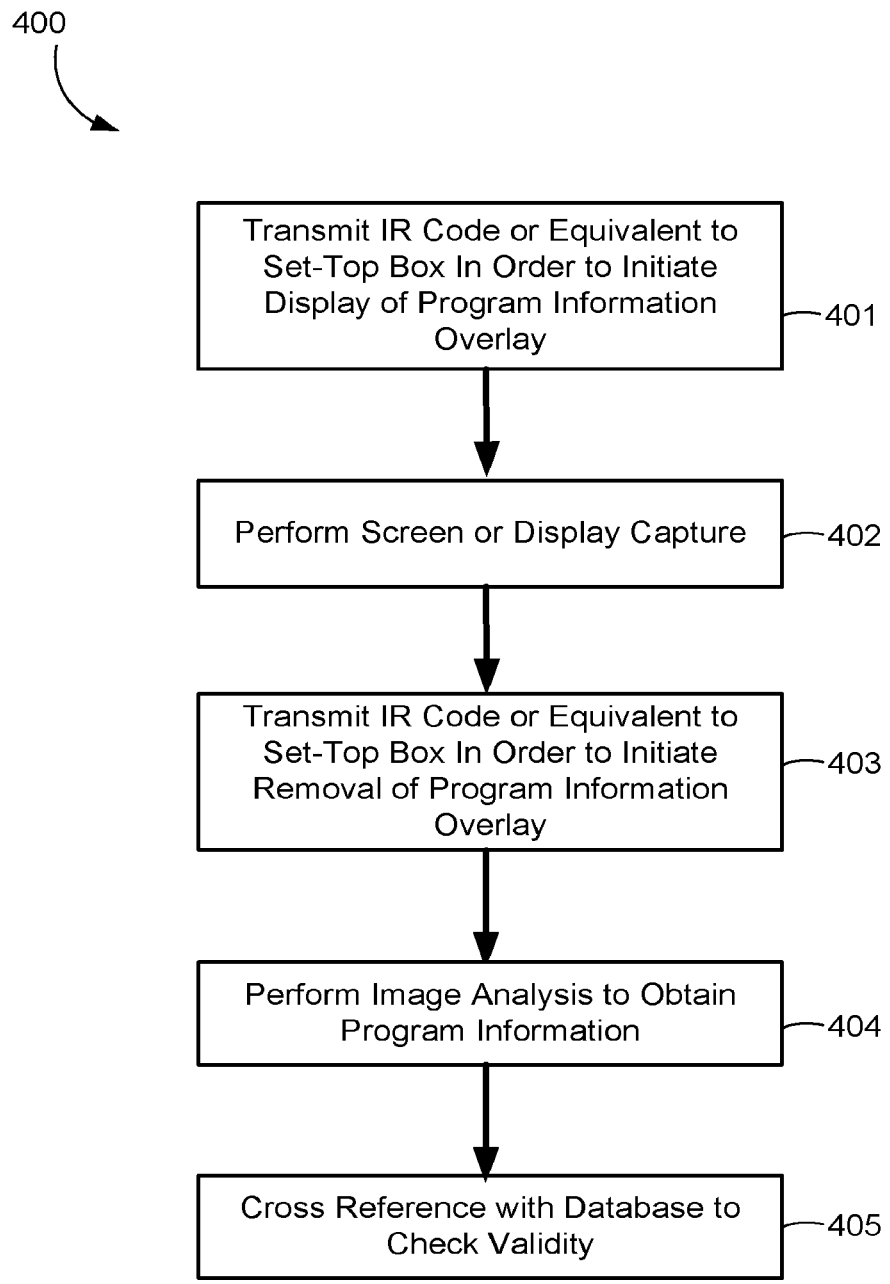
FIG. 4 is a flowchart representation of an implementation of a method of determining what a consumer is currently watching.

FIG. 4 is a flowchart representation of an implementation of a method 400 of determining what a consumer is currently watching. In some implementations, the method is performed by a device, such as a supplemental set-top box and/or a television integrated module, in order to enable determining what a consumer is currently watching by, in part, emulating the operation of a remote control device associated with the primary set-top box. To that end, the method includes transmitting a first infrared (IR) code (or the like) to the primary set-top box in order to initiate the display of the program information overlay (401). For example, with further reference to FIG. 1A, one of the client device 102 and the client device 120 may transmit an IR code to the set-top box 103.

The method then includes performing a screen capture to acquire a screen shot (i.e. image) including the program information overlay (402). Having acquired the screen shot, the method includes transmitting a second IR code (or the like) to the primary set-top box in order to initiate the removal of the program information overlay on the playing television program (403). The method includes analyzing the image or screen shot to obtain the program information presented in the overlay (404). Having extracted the title and/or program information, the method includes cross-referencing the extracted information with a local and/or remote database 133 to ensure the validity of the information (406).

Figure 5:
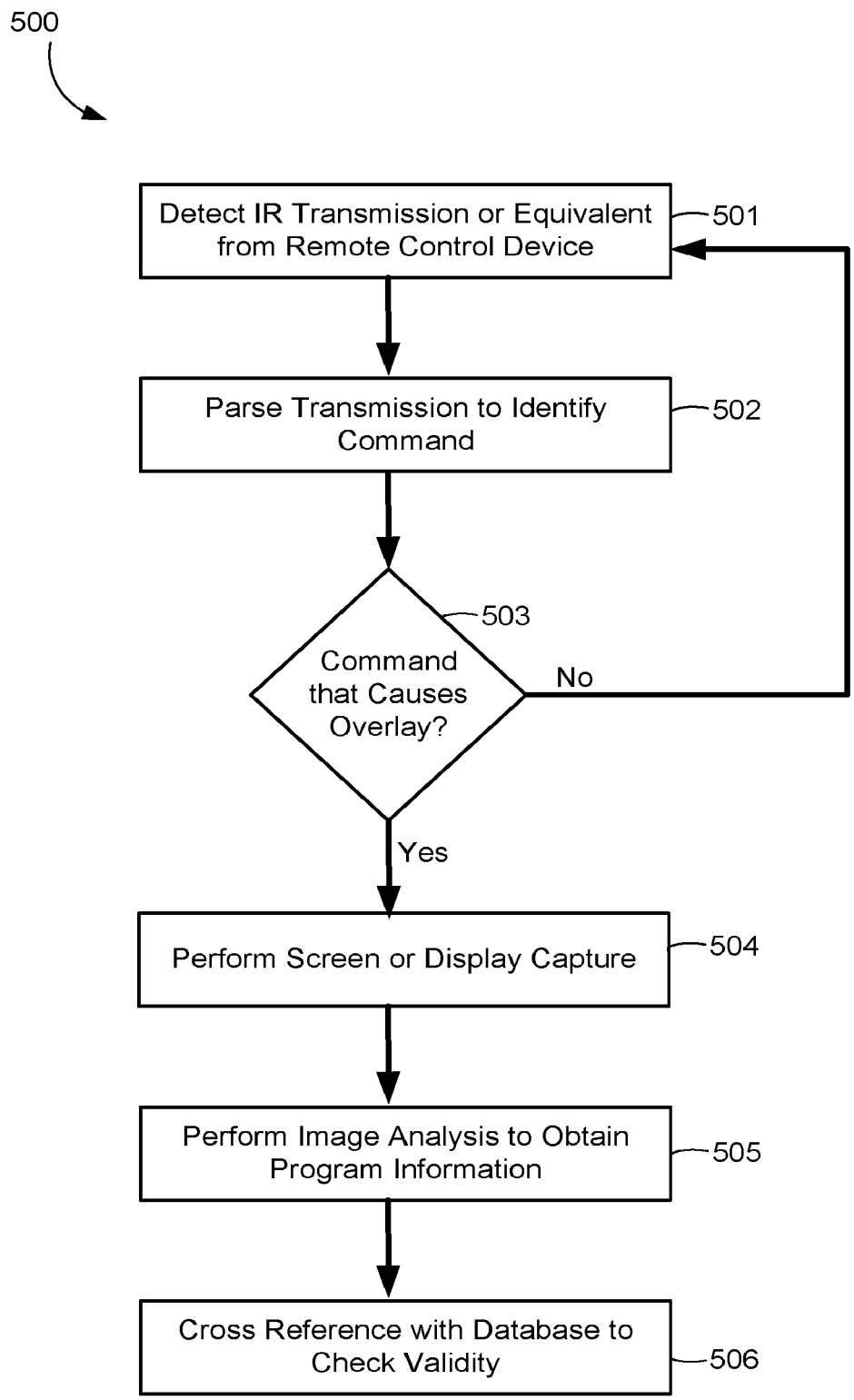
FIG. 5 is a flowchart representation of an implementation of a method of determining what a consumer is currently watching.

FIG. 5 is a flowchart representation of an implementation of a method 500 of determining what a consumer is currently watching. In some implementations, the method is performed by a device, such as a supplemental set-top box and/or a television integrated module, in order to enable determining what a consumer is currently watching, by detecting IR transmission from a remote control device associated with the primary set-top box. For example, with further reference to FIG. 1A, the client device 102 may detect IR transmissions directed to the primary set-top box 103 from the remote control device 120.

To that end, the method includes detecting an IR transmission or equivalent from a remote control device associated with a primary set-top box (501). In turn, the method includes parsing the transmission in order to identify the command that is represented by the IR transmission (502). Having identified the command, the method includes determining whether or not the identified command causes the primary set-top box to provide the program information overlay in the video stream provided to the display device. If the detected command is not likely to cause the primary set-top box to provide the program information overlay ("No" path from 503), the method includes circling back to detect another IR transmission. On the other hand, if the detected command is likely to cause the primary set-top box to provide the program information overlay ("Yes" path from 503), the method includes performing a screen or display data capture from the display device that is displaying the television program selected by the consumer through a primary set-top box or the like in order acquire an image of what is being displayed (504). The method includes analyzing the image or screen shot to obtain the program information presented in the overlay (505). And, the method includes cross-referencing the extracted information with a local and/or remote database to ensure the validity of the information (506).

Figure 6:
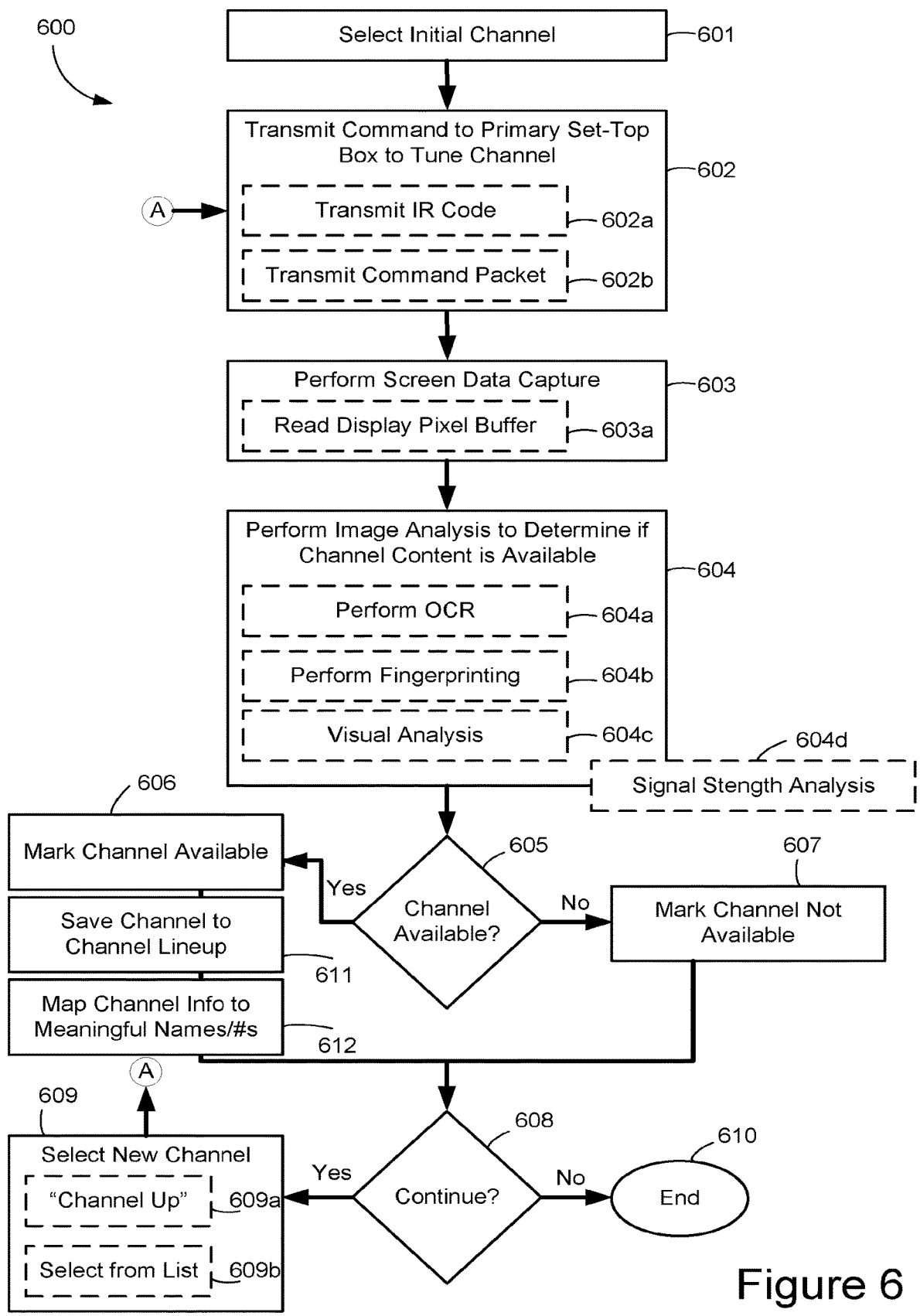
FIG. 6 is a flowchart representation of an implementation of a method of determining channel line-up access available through a primary set-top box.

FIG. 6 is a flowchart representation of an implementation of a method 600 of determining channel line-up access available through a primary set-top box. In some implementations, the method is performed by a device, such as a supplemental set-top box and/or a television integrated module, in order to enable determining channel line-up access available through a primary set-top box by using the primary set-top box channel control commands. For example, with further reference to FIG. 1A, the client device 102 may transmit IR transmissions to the primary set-top box 103 or provide equivalent signaling.

To that end, the method 600 includes selecting an initial candidate channel to probe using the primary set-top box channel control commands (601). In some implementations, a candidate channel is any one of the suspected channel numbers that may be available through the primary set-top box. Having selected a candidate channel, the method 600 includes transmitting a control command to the primary set-top box to tune the primary set-top box to the candidate channel (602). For example, in some implementations, transmitting a control command includes transmitting an IR code (602a). In some implementations, transmitting a control command includes transmitting a command packet over a data connection (602b).

Subsequent to transmitting the control command, the method 600 includes performing a screen data capture (603). In some implementations, performing a screen data capture includes reading a display pixel buffer and/or reading from a display pixel bus in order to obtain at least a single frame of screen display information (603a). The method 600 then includes performing an image analysis to determine if the candidate channel is available as a part of a subscription associated with the primary set-top box, and thus delivering non-superfluous television content (604). In some implementations, non-superfluous television content includes television programs, sporting events, news broadcasts, movies, etc. In some implementations, superfluous television content includes data such as pay-per-view title screens, subscription information (e.g. a contact number or website address), looping advertisements and/or content trailers indicating the type of content that would be available to a subscriber of the channel that is currently not available because the primary set-top box is not associated with such a subscriber. In some implementations, performing image analysis includes performing and/or applying OCR to identify text content in the screen display data (604a). In some implementations, performing image analysis includes fingerprinting the at least one frame of screen display data to identify the program content (604b). In some implementations, performing image analysis includes performing a video analysis to determine whether or not the candidate channel is being used to deliver non-superfluous television content (604c). In some implementations, in addition to, or as a substitute for visual analysis 604c, the channel selection model 440 (FIG. 2A) or equivalent functionality determines (604d) whether a particular channel is carrying non-superfluous television content by analyzing signal strength of channels.

Based on the image analysis, the method 600 includes deciding whether the candidate channel is being used to deliver non-superfluous television content (605). If the candidate channel is being used to deliver non-superfluous television content ("Yes" path from 605), the method 600 includes marking the candidate channel as available or a member of the subscription line-up available through the primary set-top box (606). If the candidate channel is not being used to deliver non-superfluous television content ("No" path from 605), the method 600 includes marking the candidate channel as unavailable or not a member of the subscription line-up available through the primary set-top box (607). Information for active channels is then saved in one of the channel lineups 180 (611). Information saved for the active channels includes information recognized from the displayed channel information (such as channel number and name) and information obtained from local or external sources, such as a program guide stored on the client device 102 or a server that is coupled to the client device 102 via a network 104 (e.g., the media server 130, FIG. 1A).

In some implementations, when there are multiple input sources, such as cable TV, over the air TV, and satellite TV, channels from a particular input source are saved and stored in a respective channel lineup. For example, FIG. 2A illustrates two saved channel lineups 180-1 and 180-2. Also, in some implementations, to make the channel lineups more user-friendly and/or to identify channels that are duplicated across multiple lineups, the displayed and OCR'd channel information is mapped to meaningful names/channel numbers, such as local over the air (OTA) channel numbers or channel names, such as network names (612). These meaningful channel names and numbers are then saved in the channel lineups along with the recognized displayed channel information. The information (e.g., channel map information 282) used to map the OCRed channel information to meaningful channel names and numbers can be previously stored on the client device 102 and/or downloaded from the server. Alternatively, the client device 102 can issue one or more requests to the server to map the channel information based on information available to the server for channel lineups available in the area of the client device 102 for different input sources/content providers.

Subsequent to deciding upon the status of the candidate channel, the method 600 includes determining whether or not to continue based on the suspected existence of additional channels (608). In some implementations, at least one addition candidate channel is suspected to exist when each of the candidate channels considered thus far has only been considered once and/or an equal number of times without overlap. If at least one more channel is not suspected to exist continue ("No" path from 608), the method 600 ends (610). If at least one more channel is suspected to exist continue ("No" path from 608), the method 600 includes selecting a new candidate channel and reiterating the portion of the method starting at block 602 (609). In some implementations, selecting a new candidate channel includes using the "channel up" (or "channel down") primary set-top box control command (609a). In some implementations, selecting a new candidate channel includes selecting a new channel from a list or the like (609b). In addition, the method described with reference to FIG. 6 (and the related methods described with reference to FIGS. 4 and 5) can be used to identify channel lineups available to viewers of non-subscription media content, such as over the air broadcasts that are received by a TV receiver, such as a TV receiver included, without limitation, in a computer, a media player, such as a DVD or Blu-ray player, or a digital video recorder (DVR).

In some implementations, in addition to TV content, other types of media content and services can be provided through the primary set-top box 103. The content or other services can be provided via a direct (wired or wireless) connection to the set-top box 103, as built-in features of the set-top box 103, or via a network connection. For example, a digital video recorder (DVR) built into a set-top box can be used to record TV content or playback recorded TV content; the set-top box 103 can be used to access video-on-demand (VOD) content available from the cable or satellite provider associated with the set-top box; or the set-top box can be used to monitor or control a home security system. Using capabilities similar to those described above with reference to FIGS. 1-6, in some implementations a client device 102 is configured to receive display information from services/features provided via a primary STB 103 and to interact with (e.g., control and access) those services without using custom APIs for a particular primary set-top box.

For example, in some implementations, in a trial and error process the client device 102 sends via a one-way wireless connection provided by the set top box (such as an IR or RF interface) a sequence of one or more commands to cause the set-top box 103 to exercise certain features/services and/or access certain STB content (e.g., DVR services or VOD content). In some implementations, consistent with techniques described above, the client device 102 then analyzes display characteristics (e.g., position, size, graphics and content) of text overlays and/or other images/information associated with the resulting images displayed by the television 110 in response to the one or more commands and determines whether those text overlays are as expected given the one or more commands that were sent. In some implementations, the client device 102 performs this determination by comparing the identified display characteristics of the resulting text overlays to a database of expected overlay display characteristics generated by particular makes and models of set top box in response to particular commands associated with particular set-top box feature sets. If the identified overlay display characteristics are consistent with the expected overlay display characteristics, the client device 102 stores information identifying the set top box's make and model, as well as correct sequence of one or more commands used to access particular features. In this way, the client device 102 can identify useful commands and features provided by the set-top box 103 and subsequently control those features using the identified command sequences.

In some implementations, once the client device 102 has identified the make, model and feature set of the set top box 103, the client device 102 can download from another device (e.g., a network server) command sequences for controlling the set-top box 103.

In any of these contexts, the command sequences can be conventional remote control commands supported by the STB 130, which the client device 102 can send using a compatible IR or RF transmitter, or network commands (e.g., WiFi or Bluetooth) supported by the STB 103, which the client device 102 can send via its own network connections. In this way, the client device 102 is able to control the feature set provided by the set top box 103—even though the only connections provided by the set top box 103 are one way connections (e.g., output audio and video signals with no control capabilities or remote control connections). Of course, the methods described herein are applicable to any communication modalities that are supported by a STB to enable control of its feature set and access to video and audio signals that reflect its outputs. Similarly, the methods described herein are applicable to identifying command sequences and controlling feature sets of any electronic device via comparable one way connections.

Figure 7:
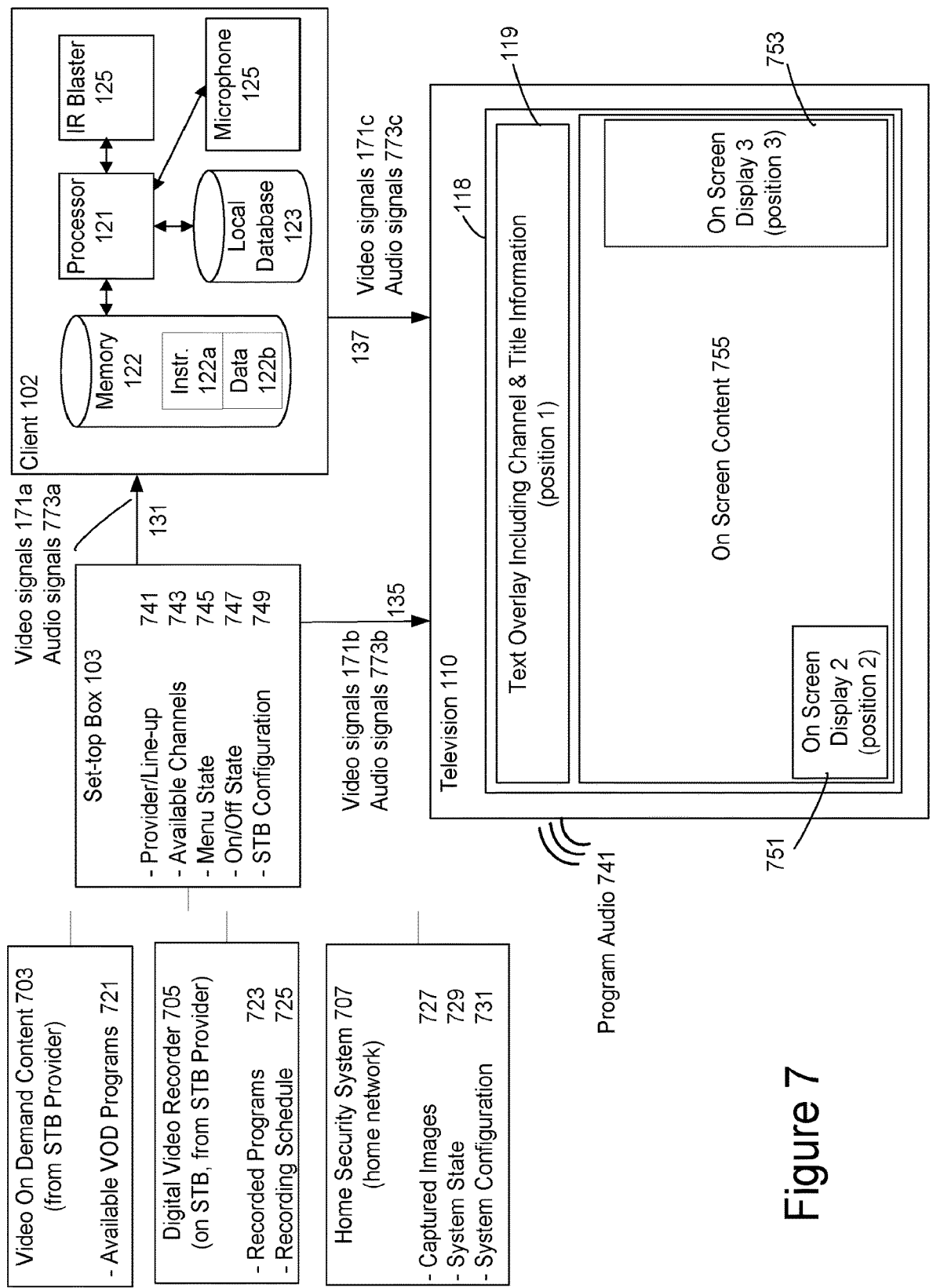
FIG. 7 is a diagram of an implementation of the client-server environment of FIG. 1 including an example schematic display on a television illustrating several functions provided by an example primary set top box coupled to a client operable as a supplemental set top box.

As a further illustration, FIG. 7 is a diagram of a portion of the client-server environment 100 including an example schematic screen display on the TV 110 and showing additional features provided by the set-top box 103 and the client device 102 of FIG. 1. The TV 110 includes the display 118 on which video of a media program is displayed. In addition to receiving and displaying TV content on the TV 110 (or other display), the set-top box 103 is configured with a variety of services/features, including, without limitation, video on demand content 703, digital video recorder (DVR) features 705 and home security system features 707. These services/features can be provisioned to/by the set-top box 103 in a variety of ways. For example, the VOD content 703 is provided by the content provider associated with the STB 103 (i.e., the STB provider), the DVR services/features 705 can be provided by computing and storage components internal to the STB 103 or remotely by the STB provider, and the home security system services/features 707 can be accessed via a home network or in some cases by direct connection to the STB 103.

In some implementations, representative VOD features 703 include allowing a user to view and select video content from a list of available VOD programs 721; representative DVR features 705 include allowing a user to view and select from a list of recorded programs 723 and view and/or define a recording schedule 725; and representative home security features 707 that can be accessed through the STB include allowing a user to view images captured from security cameras 727, view and reset security system state 729 and view and update and security system configuration 731. In some implementations, state information associated with these features, which is relevant to controlling the features, might not be directly displayed by the STB 103 in response to user commands (including commands sent by the client device 102), but these states can be ascertained by the client device 102 by sending particular command sequences and observing the resulting video and audio signals 171a, 773a provided by the STB 103.

Similarly, the STB 103 has its own features and settings that can be identified or controlled by a user or a client device 102 with the appropriate command sequences. These features and settings include, without limitation, allowing a user to view information pertaining to: STB provider and channel/feature lineup 741, available channels 743, and on screen menus 745 to allow a user to interact with those and other features (such as a top level menu to allow the user to access VOD, DVR and home security services/features). The STB 103 also has state information that is relevant to controlling the STB 103 and its associated services/features. In some implementations this state information includes menu state 747 (i.e., the currently displayed menu), on/off state 749 (e.g., whether the STB is on or off) and the STB configuration 751 (e.g., without limitation, its provisioned services and features and the types of its available and/or active connections—such as the fact that an example STB 103 it supports WiFi commands, has IR and RF command receivers, is DLNA compatible, has 2 HDMI outputs, including one HDMI 2.0 output, and has component video and S-video outputs).

As shown in FIG. 7, and consistent with FIG. 1B, in some implementations the client device 102 is any computer device capable of connecting to the communication network 104 and the TV 110, receiving audio and video signals 171a, 773a from the set box 103, and issuing commands 777 to the set-top box 103. In some implementations, the client 102 is connected to the set-box 103 via a connection 131 by which the client 102 can receive video signals 171a and audio signals 773a from the set top box 103 the same as or comparable to the video signals 171b and audio signals 773b provided by the set top box 103 to the television 110 via the connection 135. This allows the client 102 to analyze and perform optical character recognition (OCR) on the text overlay 119 provided by the set top box 103 along with the video and/or audio content and/or metadata associated with the show being watched (all provided as part of the video signals 171). In some implementations, the communications 131, 135 between the set top box 103 and the TV 110 and/or the client 102 are substantially or entirely one way. That is, while it is possible for the set top box 103 to provide signals to the TV 110 and the client 102, it is not possible for the TV 110 and the client 102 to control the set top box 103 via commands sent back to the set top box 103 via the connections 131 and 135. Consistent with descriptions of FIG. 1B, in some implementations the client is configured to issue commands 777 to the set-top box 103 by a connection 775 that can be one or more of a network connection (such as a WiFi or Bluetooth network connection) or RF or IR connections). As described with reference to FIG. 5, in some implementations, the client device 102 is capable of receiving infrared (IR) transmissions directed to the set-top box 103 from the remote control device 112. Additionally and/or alternatively, in some implementations, the client device 102 is capable of wired and/or wireless communication with the client device 120, the set top box 103 and the TV 110.

In some implementations, the client device 102 includes one or more processors 121, non-volatile memory 122 such as a hard disk drive, and a local database 123. In some implementations, the memory 122 includes application instructions 122a and associated data 122b. In some implementations, as described above, the local database 123 and/or the associated data 122b stores information related to local channel lineups, including one or more local channel lineups 180-i discovered through operations described above. In some implementations, the local database 123 and/or the associated data 122b also store data and commands related to accessing and controlling services and features provided by the STB 103. In some implementations, the operations for controlling the STB 103, including sending commands to the STB 103, are performed by the application instructions 122a. In some implementations, the client device 102 includes IR and/or RF blasters/transmitters to send RF or RF commands 777 to the set top box 103, the TV 110 or other compatible devices. In some implementations, the client device includes a microphone to receive audio signals 773 provided by the STB 103 in order to assess the current state and/or programming and/or feature set of the STB 103.

Further, while the video is being displayed, or in response to particular commands sent to the set-top box 103, the set-top box 103 may provide a variety of text overlays 119, 751, 753 that include information related to an associated STB service or displayed content type. For example, FIG. 7 shows example text overlays 119, 751, 753 associated respectively with TV program content, features and content associated with a DVR 705, and on demand programs available from a video on demand provider 703. The set-top box 103 can also provide access to other services and features, such as services/features of a home security system 707 controlled through the set-top box 103. Each of these features provides via the set-top box 103 has its own associated text overlays for display with the on screen content 755 presented on the TV 110. The purpose of these overlays and other information is to enable user interaction with the associated services and features. As described with reference to FIGS. 1-6, the overlay information can be stimulated, received and analyzed by the client device 102 in order to provide interactive, two-way control of the STB 103— even though the STB is not natively configured with connections to permit the client device 102 such level of control. Also, as described with reference to FIGS. 1-6, in some implementations, the overlay information can be passively received by the client device 102 (e.g., when generated in response to a user command to the STB 103) and then analyzed by the client device 102 in order to identify a make and model of the STB as well as a current state of the STB 103.

In different implementations, the one or more overlays associated with respective STB features and services are typically presented with associated screen positions, bounding box size (e.g., the size of the overlay either as x and y pixel dimensions or a percentage of screen occupied by the overlay), content, content styles and formatting, and graphics. The positions, bounding box sizes and content of the overlays 118, 751, 753 shown in FIG. 7 are simply examples of different styles of overlays 119, 751 and 753 associated respectfully with TV content, DVR features and VOD features. As described with respect to FIG. 1B, the text overlay 119 typically includes the channel the media program is being presented on, as well as the title of the media program. The text overlay 119 also often includes information about actors, characters, and/or a synopsis of the media program. The content of the DVR overlay 751 is based on information provided by features of a digital video recorder 705 provided by the set top box 103, including, for example, a list of recorded programs and a recording schedule displayed in response to corresponding commands 777 sent by the client device 102. The content of the VOD overlay 753 is based on information provided by VOD features provided by the set top box 103, including, for example a list of available VOD programs displayed in response to corresponding commands 777 sent by the client device 102. As noted above, these overlays are presented in a characteristic manner based on the associated make, model and feature set of the STB. Accordingly, these typical display characteristics can be used by the client device 102 to identify the associated make, model and feature set of the STB and to determine whether the client device 102 is sending the correct command sequences for controlling the STB and/or particular services and features provide by the STB.

Figure 8A:
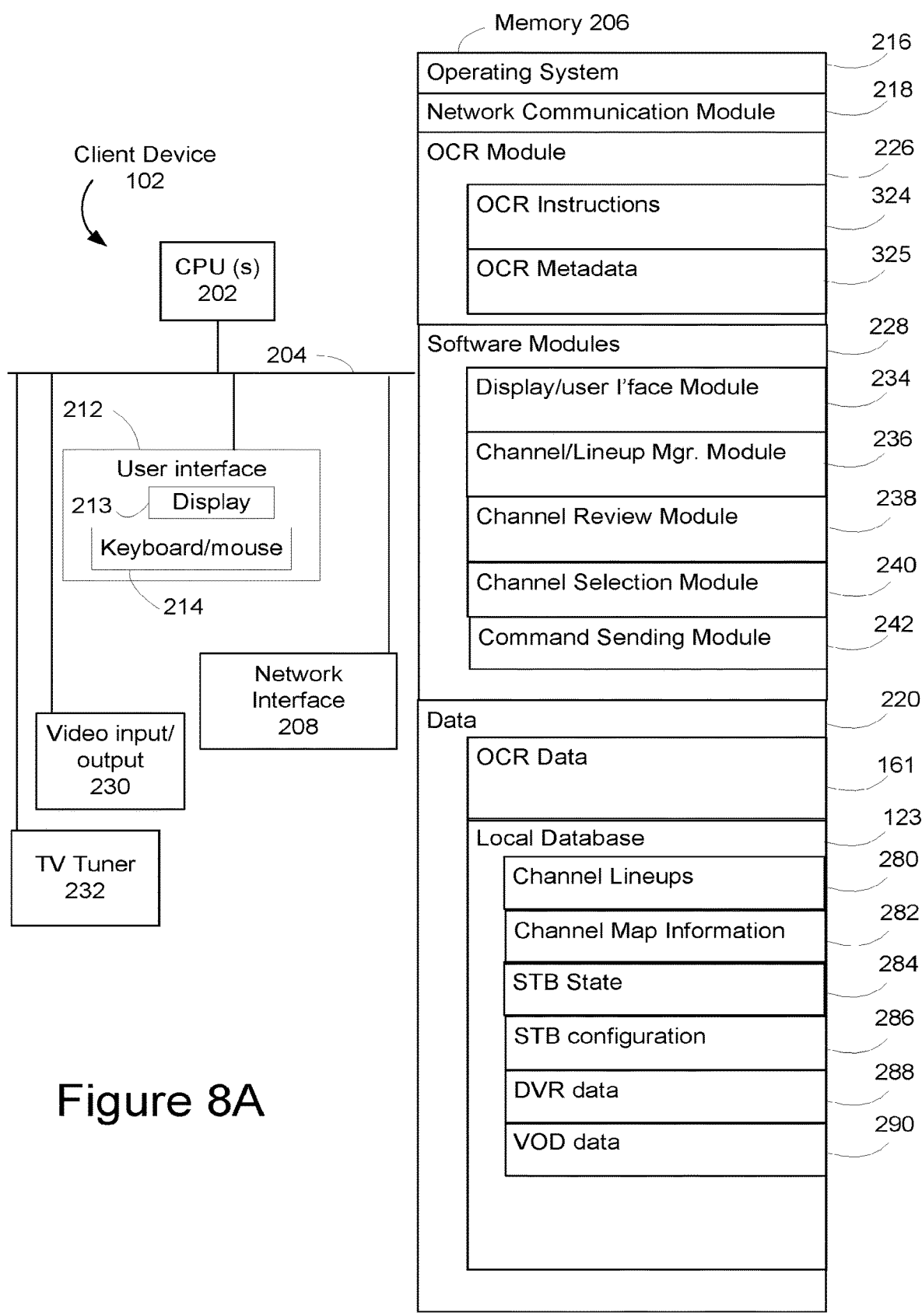
FIG. 8A is a diagram of an example implementation of a client device operable as a supplemental set-top box and/or a television-integrated device.

FIG. 8A is a diagram of an example implementation of the client device 102, discussed above with reference to FIG. 1A, and which may be operable as a supplemental set-top box and/or a television-integrated device. In some implementations, the client device 102 includes all or a subset of the functionality described with respect to FIG. 2A and all or a subset of the features described with reference to FIG. 8A. While certain specific features are illustrated, those skilled in the art will appreciate from the present disclosure that various other features have not been illustrated for the sake of brevity and so as not to obscure more pertinent aspects of the implementations disclosed herein. To that end, the client device 102 includes one or more processing units (CPU's) 202, one or more network or other communications interfaces 208, memory 206, a TV tuner 232, a video I/O 230, and one or more communication buses 204, for interconnecting these and various other components. The communication buses 204 optionally include circuitry (sometimes called a chipset) that interconnects and controls communications between system components. The client device 102 may also include a user interface 212 comprising a display device 213 and a keyboard and/or mouse (or other pointing device) 214 and/or a remote control (etc.). Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternatively the non-volatile memory device(s) within memory 206, comprises a non-transitory computer readable storage medium. In some implementations, memory 206 or the computer readable storage medium of memory 206 stores the following programs, modules and data structures, or a subset thereof, including an operating system 216, a network communication module 218, an OCR module 226, software modules 228, and data 220.

The operating system 216 includes procedures for handling various basic system services and for performing hardware dependent tasks.

The network communication module 218 facilitates communication with other devices via the one or more communication network interfaces 204 (wired or wireless) and one or more communication networks, such as the Internet, other wide area networks, local area networks, metropolitan area networks, and so on.

In some implementations, the OCR module 226 enables the client device 102 to process screen shots (e.g. images from the TV 110) to obtain the program information included in the program information overlay and information associated with services and features provided by the primary set-top box 103. To that end, the OCR module 226 includes OCR instructions 324 and metadata 325. As described with reference to FIG. 2A, in some implementations, the OCR instructions 324 include instructions that perform OCR operations to recognize program information from TV images and content and the metadata 325 includes data employed by the OCR module to support OCR operations. For example, in some implementations the metadata includes information related to common combinations of words associated with TV channels and programs, such as channel names, broadcaster names, and words commonly used in program titles. In some implementations, the OCR instructions 324 include instructions that perform OCR operations to recognize information and graphical characteristics associated with other services and features provided by the STB 103, such as DVR, VOD and home security services, and the metadata 325 includes data employed by the OCR module to support OCR operations. For example, in some implementations the metadata includes information related to common combinations of words and symbols associated with information overlays generated by different set-top box makes and models for different feature sets.

In some implementations, the software modules 228 include a display/user module 234, a channel lineup manager module 236, a channel review module 238, a channel selection module 240, a command sending module 242, an STB command/response module 814, a UI display comparison module and an STB control module. In some implementations, the display/user module 234 displays information provided by other software modules. The displayed information can include a channel lineup 180 discovered by some combination of the OCR module 226, channel lineup manager module 236, channel review module 238, and channel selection module 240. In some implementations, the channel lineup manager module 236 maps the discovered channel numbers to actual over the air channels as applicable and to cable channel names (e.g., by using the channel map information 282). The channel review module 238 enables a user to review, correct and remove channel information. In some implementations, the channel selection module 240 employs an IR blaster 125 (FIGS. 1B and 7) to send appropriate channel tuning/selection and "info" commands to the STB (or alternatively, the TV 110). In some implementations, the channel selection module 240 and other modules or operations described herein that interact with the IR blaster 125 or other command interfaces to send commands to the TV 110 or the STB 103 do so via a command sending module 242. Thus, using the recognized channel lineup information, a user is able to control the TV 110 via the client device 102 (which only possesses a one-way connection to the STB and no prior knowledge of the applicable channel lineup) as if the client device 102 possessed a two-way connection to the STB 103 and had prior knowledge of the channel lineup. Similarly, a user is able to control and otherwise interact with services and features provided by the STB 103 (such as DVR and VOD services) via the client device 102 as if the client device 102 possessed a two-way connection to the STB 103.

Related to identifying and controlling other features of the STB, the STB command and response module 814 includes instructions for sending commands to the STB 103 for identifying command sequences that can be used to control particular STB services and features (e.g., DVR and VOD services) and identifying responses, if any, to those commands based on review and analysis (supported by the other software modules as required) of the corresponding audio and/or video signals 171*a*, 773*a* provided by the STB (collectively and/or individually referred to herein as display response data, response data or display responses). The STB command and response module 814 in some implementations also manages the trial and error process described herein that includes sending trial command sequences 834 to the STB 103 in order to identify correct command sequences 836 for a particular make and model of set top box 103 and saving locally the correct command sequences 836 for re-use (e.g., to permit the user to control the associated services and features via the client device 102). In some implementations, the UI display comparison module 816 performs operations similar to those performed by the OCR 426 to analyze the response data and compare that data to known/expected response data (e.g., Expected Display Responses 832) that would be generated by a range of different set top box makes and models for a wide range of services and features in response to specific commands and command sequences. The STB control module in turn is configured to allow the user to access the services and features provided by the STB 103 by providing access to the correct command sequences 836 for controlling those various services and features as if the user were doing so via an interface provided directly by the STB 103.

Figure 8B:
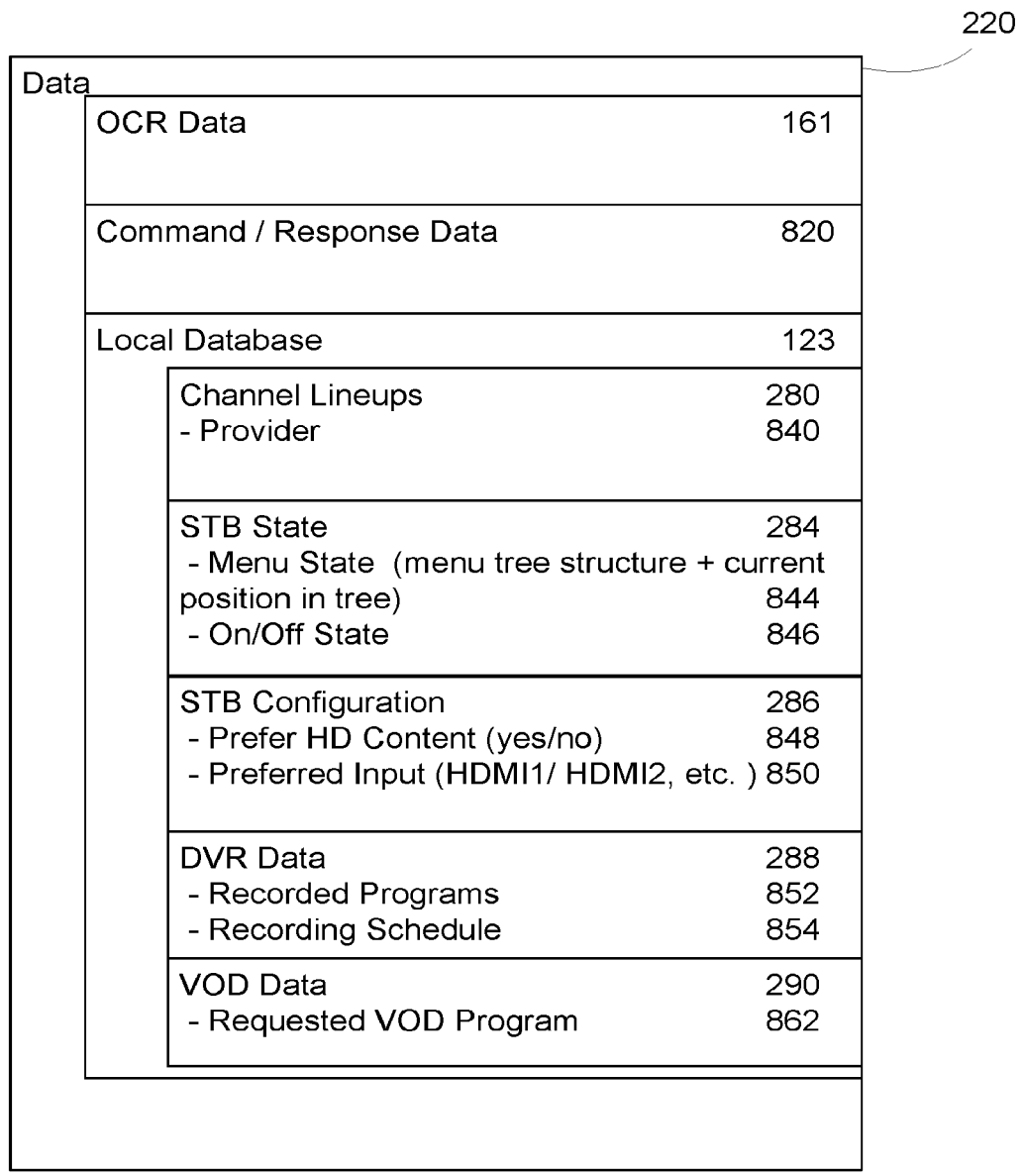
FIG. 8B is a diagram showing additional details of the Local Database of FIG. 8A.
Figure 8C:
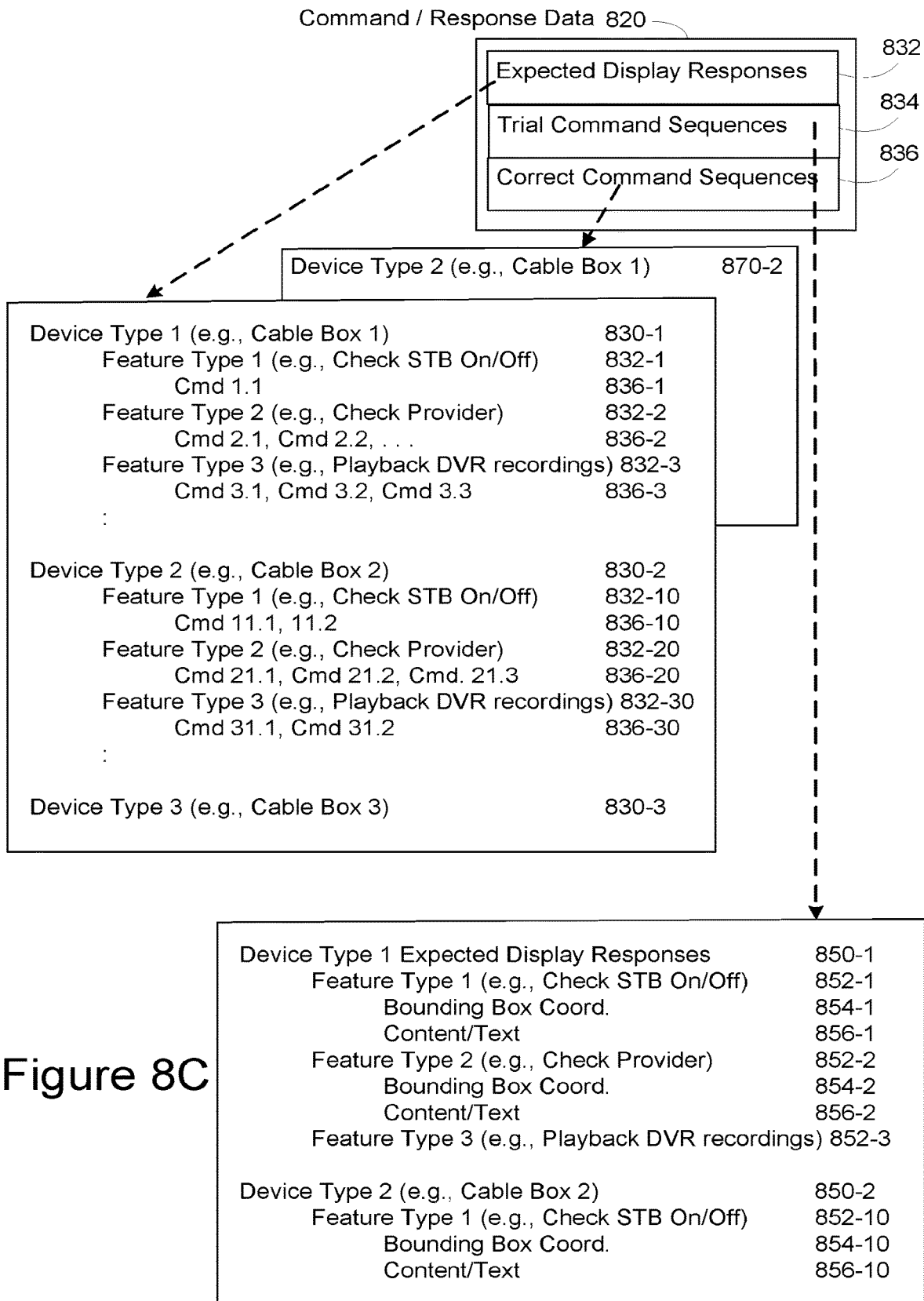
FIG. 8C is a diagram showing additional details of the Command/Response Data of FIG. 8A.
Figure 9A:
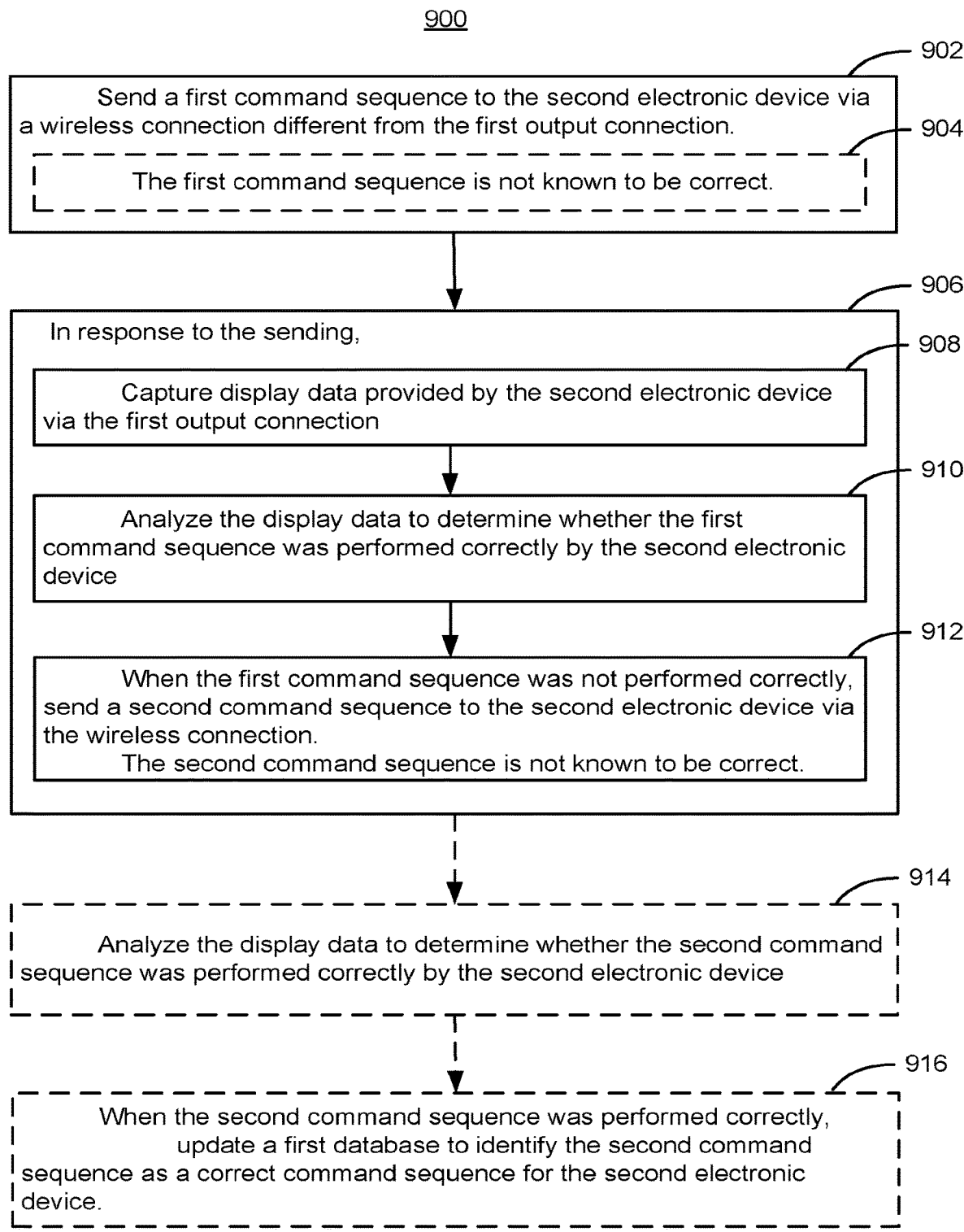
FIGS. 9A and 9B are flowcharts representations of respective implementations of a method of controlling a primary set top box based on display information provided by a one way connection from the primary set top box.
Figure 9B:
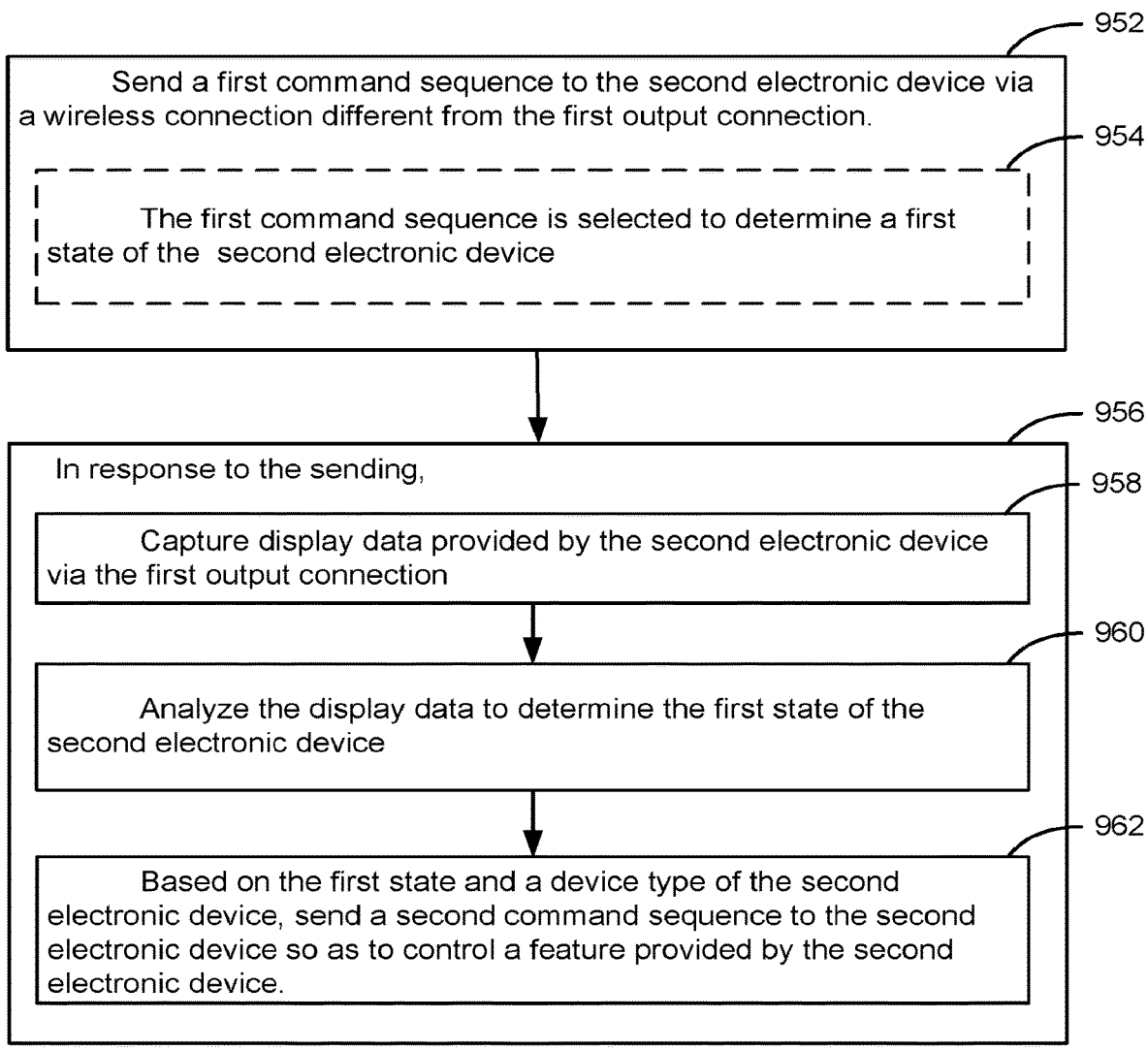

The data 220 includes OCR data 161 described above (also as extended for use by the software modules described in reference to FIGS. 8A-8C and methods describe in reference to FIGS. 9A-9B) and command response data that includes expected display responses 832, trial command sequences 834 and correct command sequences 836, already described. The data 220 also includes local database information 123 that includes, but is not limited to, data related to channel lineups 280 (described in reference to FIG. 2A), channel map information 282, STB state 284, STB configuration 286, DVR data 2880, and VOD data 290. These local database items 280 to 290 are described in greater detail in reference to FIG. 8B.

FIG. 8B is a diagram showing additional details of the data 220, which includes OCR data 161, command/response data 820, and local database data 123. The local database data 123 further includes data regarding channel lineups 280, STB state 284, STB configuration 286, DVR data 288 and VOD data 290. The OCR data 161 is described above and the command/response data is described below, in reference to FIG. 8C. Similarly, the channel lineups data 280, which includes for the purposes of this discussion an identity 840 of the cable or satellite service provider, is described above in reference to FIGS. 1-6. The channel lineups 280, STB state 284, STB configuration 286, DVR data 288 and VOD data 290 include information that is relevant to and supports control by the client device 102 of the STB 103. Much of this information has been described with reference to FIG. 7 in relation to features of the STB 103. In some implementations, the STB state 280-3 includes a menu state 844 of the STB 103, which includes, without limitation, an identification of the currently active STB menu and a representation of the menu structure supported by the STB 103. The STB state 284 also includes an on/off data item 846 representing the current on/off state of the STB 103. The STB configuration 286 includes information related to the hardware and software configuration of the STB 103, such whether the user prefers high definition (HD) content 848, and which input 850 to the STB 103 is preferred by the user. The client device 102 can use this information to set the configuration of the STB 103 when it is powered-up, or, conversely, to identify the default configuration of the STB 103 when it is powered-up. Actual STB configuration and STB state information 286 and 284 saved by the client device 102 can include more or different data items than those described herein; in fact, it is intended that these data items and other data items 220 described herein are configurable as required in respective implementations to save and provide information (e.g., STB state and configuration data) that supports control of the STB 103 by the client device 102 and/or use of the client device 102 for such purpose by a user. In some implementations, the DVR data 288 includes information related to recorded programs 852 available for playback from the DVR 705 and one or more recording schedules 854 for the DVR 705. In some implementations, the VOD data 290 includes information related to one or more video on demand programs 862 requested by the user. By storing such information (in the cloud or locally) the client device 102 is able to support user interaction with the STB 103 with minimal involvement of the STB (e.g., the client device 102 can provide user access to recorded DVR programs without the need to access a list of such programs from the STB 103).

FIG. 8C is a diagram showing additional details of the Command/Response Data 820 of FIG. 8B. This figure shows example data stored by the client device 102 in one implementation for a set of expected display responses 832, trial command sequences 834 and correct command sequences. The trial commands sequences 834 includes a set of command sequences for a particular STB device type 830-*i*, where a device type is typically a combination of STB make and model. For each STB device type 830-*i*, the trial command sequences include a specification of a command sequence of one or more commands to access and control a particular feature type. For example, FIG. 7 includes trial command sequence information for three example device types (Cable Boxes 1, 2 and 3), where the sequence information is provided for a number of features. For example, for Cable Box 1, the saved command sequences 830-1 includes sequences for at least three features, Feature Types 1, 2 and 3, each with different associated commands. For example, the command sequence for Feature Type 1 832-1 includes one command Cmd 1.1 836-1 for checking the STB On/Off state of appropriate to the make and model of Cable Box 1. Other commands sequences 836-2 and 836-3 stored for Cable Box 1 device types include a sequence of commands 836-2 for Checking STB Provider (Feature Type 832-2) and a sequence of commands 836-3 for Playback DVR Recordings (Feature Type 832-3).

As described above, and further below in reference to FIGS. 9A-9B, in some implementations the client device 102 identifies correct command sequences by issuing trial command sequences to the STB 103 and then comparing the resulting display from the STB 103 response to a database of expected responses 832 to see whether there is a match between the resulting and expected display responses. Data stored for the expected display responses represent video and audio (where applicable) characteristics of text overlays and other information provided by a particular type of STB 103 in response to particular commands (e.g., one of the trial command sequences 836). Accordingly, in some implementations, the expected display responses 834 include, for a particular device type 850-*i* and feature type 852, associated display response characteristics, such as the bounding box size coordinates 852 and associated information content 856 generated in response to the associated command sequence 836. In some implementations, the content 856 represents the combination of predefined and real time content—such as the actual channel number and identifier displayed in response to an INFO command a set of features—and any associated graphics—associated with a display response to a particular command sequence). In some implementations, the bounding box coordinate information 854 corresponds to overlay information such as that shown in FIG. 7. For example, for the overlays 119, 751 and 753, the corresponding bounding box coordinates 854 would respectively represent position 1, position 2 and position 3.

The client device stores correct command sequences 836 identified through a trial and error process as described herein—or downloaded from a server based on a determined identification of the STB 103 type and feature set. The information stored for the correct command sequences 836 is comparable to the information stored for the trial command sequences 834. For example, FIG. 7 shows that information for a Device Type 2 870-2 has been saved as a correct command sequence. In some implementations, this information would be correspond to the trial command data for Device Type 2 830-2. Note that, in some implementations, the expected display responses 832 and trial command sequences 834 are stored in the cloud (e.g., at a server provided by the company that sold the client device or the associated software modules). Correct command sequences 836 can also be stored in the cloud, but it is generally helpful (e.g., to allow use of the command sequences with low latency in all circumstances) to store the correct sequences locally—at the client device. Methods for employing the data and modules described herein to allow a client device 102 to control a set-top box are now described with reference to FIGS. 9A and 9B.

FIGS. 9A and 9B are flowchart representations of respective implementations of a method of controlling a primary set top box based on display information provided by a one way connection from the primary set top box.

Referring to FIG. 9A, in some implementations, the method 900 is implemented at a first electronic device.

The method includes sending (902) a first command sequence to a second electronic device via a wireless connection different from a first output connection. The first command sequence is not known to be correct (904).

The method further includes, in response to (906) the sending, capturing (908) display data provided by the second electronic device via the first output connection; and analyzing (910) the display data to determine whether the first command sequence was performed correctly by the second electronic device.

When the first command sequence was not performed correctly, sending (906) a second command sequence to the second electronic device via the wireless connection. In some implementations, the second command sequence is not known to be correct.

In some implementations, the method optionally includes analyzing (914) the display data to determine whether the second command sequence was performed correctly by the second electronic device; and when the second command sequence was performed correctly, updating (906) a first database to identify the second command sequence as a correct command sequence for the second electronic device.

In some implementations, the first output connection of the second device is a one-way connection from the second electronic device to the first electronic device.

In some implementations, the first output connection provides video and audio data corresponding to features provided by the second electronic device.

In some implementations, the second electronic device provides a plurality of features that cannot be controlled by the first electronic device via the first output connection, the one or more programs further comprise instructions for: when the first and second command sequences are intended to control a first feature provided by the second electronic device, selecting the first command sequence and the second command sequence from a database of command sequences based on a device type of the first electronic device and a feature type of the first feature.

In some implementations, the second electronic device is a set top box and the plurality of features includes: video on demand services, digital video recorder services, EPG services, and set top box services.

In some implementations, the video on demand services include: selecting a video on demand selection for viewing.

In some implementations, the digital video recorder services include one or more of: (a) scheduling a recording of a content item provided via the set top box, (b) selecting for viewing a previously recording content item, (c) retrieving the list of programmed recording for determining user preferences, (d) modifying scheduling of a recording, and (e) deleting a recording of a content item.

In some implementations, the set-top box services include one or more of: (a) checking an on/off state of the set top box, (b) checking a menu state of the set top box, (c) checking a provider associated with the set top box, and (d) setting or determining a configuration of the set top box.

In some implementations, the method optionally includes, displaying a user interface on the display providing selectable user options for interacting with a plurality of features provided by the second electronic device; responsive to user selection of an option associated with the first feature, selecting the second command sequence from the first database; and issuing the second command sequence to the second electronic device.

In some implementations, analyzing the display data to determine whether the first command sequence was performed correctly by the second electronic device includes: based on a device type of the second electronic device and a feature type of a first feature intended to be controlled by the first command sequence: accessing a database of expected display responses, wherein the database of expected display responses indicates two or more of: (a) position, (b) bounding box locations, and (c) content of display information provided by the second electronic device for respective feature types; determining from the database of expected display responses a first expected display response associated with the first feature; comparing the captured display data to the first expected display response; and determining based on an outcome of the comparison whether the first command sequence was performed correctly by the second electronic device.

In some implementations, the method optionally includes: in response to the sending, capturing audio data provided by the second electronic device via the first output connection; and analyzing the audio data in combination with the display data to determine whether the first command sequence was performed correctly by the second electronic device.

In some implementations, the method optionally includes: when a particular device type of the second electronic device is unknown: analyzing the display data to determine whether the second command sequence was performed correctly by the second electronic device; and when the second command sequence was performed correctly by the second electronic device; updating a third database to indicate that the second electronic device is the particular device type.

In some implementations, analyzing the display data is performed at least in part at a server with which the first electronic device is in communication.

Referring to FIG. 9B, in some implementations, the method 950 of controlling a primary set top box based on display information provided by a one way connection from the primary set top box is implemented at a first electronic device.

In some implementations, the first electronic device includes one or more processors and memory and is coupled to a display and a first output connection of a second electronic device.

In some implementations, the method 950 includes, sending (952) a first command sequence to the second electronic device via a wireless connection different from the first output connection. The first command sequence (954) is selected to determine a first state of the second electronic device. The method further includes, in response to (956) the sending, capturing (958) display data provided by the second electronic device via the first output connection; analyzing (960) the display data to determine the first state of the second electronic device; and based on the first state and a device type of the second electronic device, sending (962) a second command sequence to the second electronic device so as to control a feature provided by the second electronic device.

In some implementations, the second electronic device is a set-top box and the plurality of features includes: video on demand services, digital video recorder services, set top box services, and EPG services.

In some implementations, the video on demand services include: selecting a video on demand selection for viewing.

In some implementations, the digital video recorder services include one or more of: (a) scheduling a recording of a content item provided via the set top box, and (b) selecting for viewing a previously recording content item.

In some implementations, the set top box services include one or more of: (a) checking an on/off state of the set top box, (b) checking a menu state of the set top box, (c) checking a provider associated with the set top box, and (c) setting a configuration of the set top box.

It will also be understood that, although the terms "first," "second," etc. may be used herein to describe various elements, these elements should not be limited by these terms. These terms are only used to distinguish one element from another. For example, a first electronic device could be termed a second electronic device, and, similarly, a second contact could be termed a first electronic device, which changing the meaning of the description, so long as all occurrences of the "first electronic device" are renamed consistently and all occurrences of the "second electronic device" are renamed consistently. The first electronic device and the second electronic device are both electronic devices, but they are not the same electronic devices.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A computer-implemented method comprising:
   at a first electronic device coupled to a display and a second electronic device, the first electronic device including one or more processors and memory:
   transmitting a first command sequence to the second electronic device;
   determining, based on captured display data provided by the second electronic device, a first state of the second electronic device by comparing a fingerprint of the captured display data to one or more fingerprints corresponding to a plurality of expected display responses;
based on the first state of the second electronic device, transmitting a second command sequence to the second electronic device, wherein the second command sequence controls a feature provided by the second electronic device; and
capturing audio content provided by the second electronic device, wherein the first state of the second electronic device is determined by comparing an audio fingerprint generated from the captured audio content to one or more fingerprints for expected content.

2. The computer-implemented method of claim 1, wherein the method further comprises capturing the display data provided by the second electronic device in response to transmitting the first command sequence to the second electronic device.

3. The computer-implemented method of claim 2, wherein the method further comprises generating a fingerprint of displayed user interface elements from the captured display data.

4. The computer-implemented method of claim 1, wherein the plurality of expected display responses comprise at least one of bounding box size coordinates, channel number, and text overlays.

5. The computer-implemented method of claim 1, wherein the second electronic device provides a plurality of features and wherein the method further comprises selecting the second command sequence from a database of command sequences based on a device type of the second electronic device and the plurality of features of the second electronic device.

6. The computer-implemented method of claim 1, wherein the first electronic device further includes a microphone and wherein the method further comprises capturing, via the microphone, outputted audio content provided by the second electronic device.

7. The computer-implemented method of claim 1, wherein the first command sequence and the second command sequence are trial command sequences that are not known to be correct for the second electronic device.

8. The computer-implemented method of claim 7, wherein the second command sequence is transmitted to the second electronic device in response to determining that the first command sequence was not performed correctly by the second electronic device.

9. The computer-implemented method of claim 1, wherein the method further comprises identifying a command set that includes the second command sequence as a correct command set for the second electronic device in response to determining that the second command sequence was performed correctly by the second electronic device.

10. An electronic device comprising:
a memory; and
a hardware processor that, when executing computer-executable instructions stored in the memory:
transmits a first command sequence to a second electronic device, wherein the electronic device coupled to a display and the second electronic device;
determines, based on captured display data provided by the second electronic device, a first state of the second electronic device by comparing a fingerprint of the captured display data to one or more fingerprints corresponding to a plurality of expected display responses;
based on the first state of the second electronic device, transmits a second command sequence to the second electronic device, wherein the second command sequence controls a feature provided by the second electronic device; and
captures audio content provided by the second electronic device, wherein the first state of the second electronic device is determined by comparing an audio fingerprint generated from the captured audio content to one or more fingerprints for expected content.

11. The electronic device of claim 10, wherein the hardware processor further captures the display data provided by the second electronic device in response to transmitting the first command sequence to the second electronic device.

12. The electronic device of claim 11, wherein the hardware processor further generates a fingerprint of displayed user interface elements from the captured display data.

13. The electronic device of claim 10, wherein the plurality of expected display responses comprise at least one of bounding box size coordinates, channel number, and text overlays.

14. The electronic device of claim 10, wherein the second electronic device provides a plurality of features and wherein the method further comprises selecting the second command sequence from a database of command sequences based on a device type of the second electronic device and the plurality of features of the second electronic device.

15. The electronic device of claim 10, wherein the electronic device further includes a microphone and wherein the method further comprises capturing, via the microphone, outputted audio content provided by the second electronic device.

16. The electronic device of claim 10, wherein the first command sequence and the second command sequence are trial command sequences that are not known to be correct for the second electronic device.

17. The electronic device of claim 16, wherein the second command sequence is transmitted to the second electronic device in response to determining that the first command sequence was not performed correctly by the second electronic device.

18. The electronic device of claim 10, wherein the hardware processor further identifies a command set that includes the second command sequence as a correct command set for the second electronic device in response to determining that the second command sequence was performed correctly by the second electronic device.

19. A non-transitory computer-readable medium containing computer executable instructions that, when executed by a processor of a first electronic device, cause the processor to perform a method, the method comprising:
transmitting a first command sequence to a second electronic device, wherein the first electronic device is coupled to a display and a second electronic device;
determining, based on captured display data provided by the second electronic device, a first state of the second electronic device by comparing a fingerprint of the captured display data to one or more fingerprints corresponding to a plurality of expected display responses;
based on the first state of the second electronic device, transmitting a second command sequence to the second electronic device, wherein the second command sequence controls a feature provided by the second electronic device; and
capturing audio content provided by the second electronic device, wherein the first state of the second electronic device is determined by comparing an audio fingerprint generated from the captured audio content to one or more fingerprints for expected content.

* * * * *